Sept. 6, 1938.   N. D. PRESTON ET AL   2,129,183
CENTRALIZED TRAFFIC CONTROL SYSTEM
Filed May 24, 1930   7 Sheets-Sheet 1
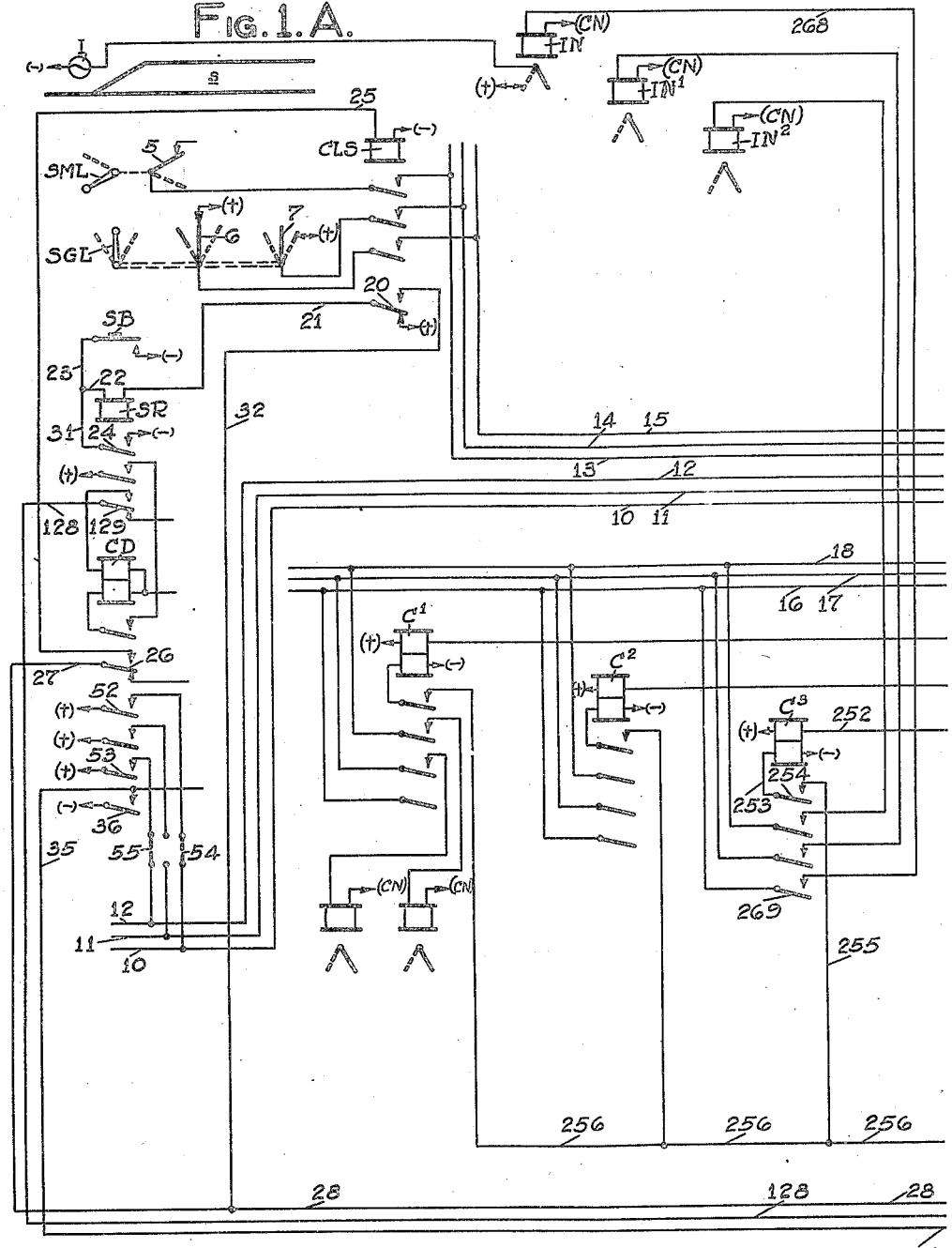
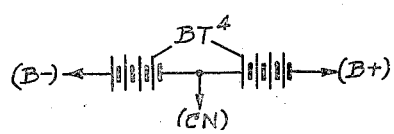
INVENTORS
N. D. Preston and
BY F. B. Hitchcock,
Neil D. Preston,
their ATTORNEY

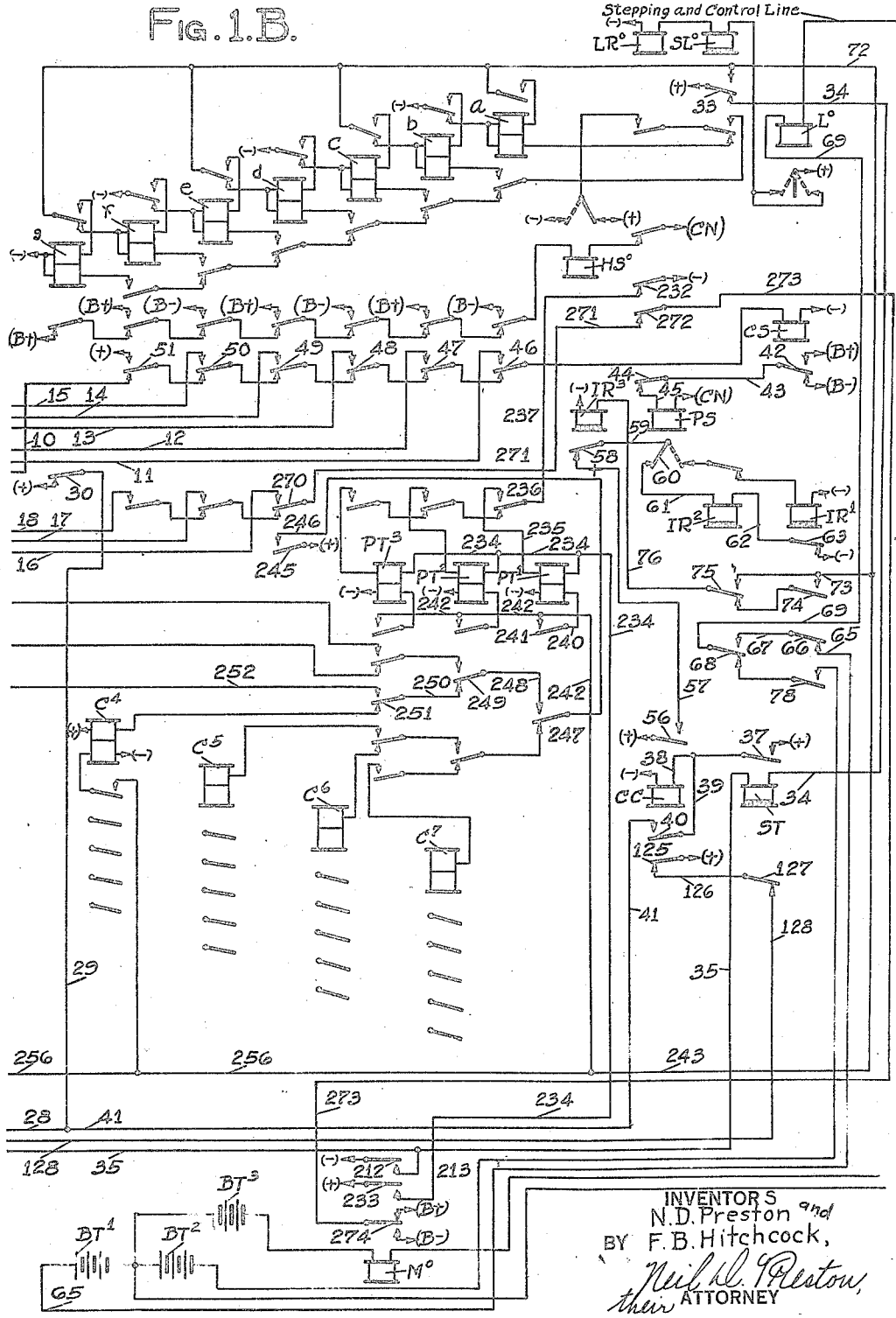

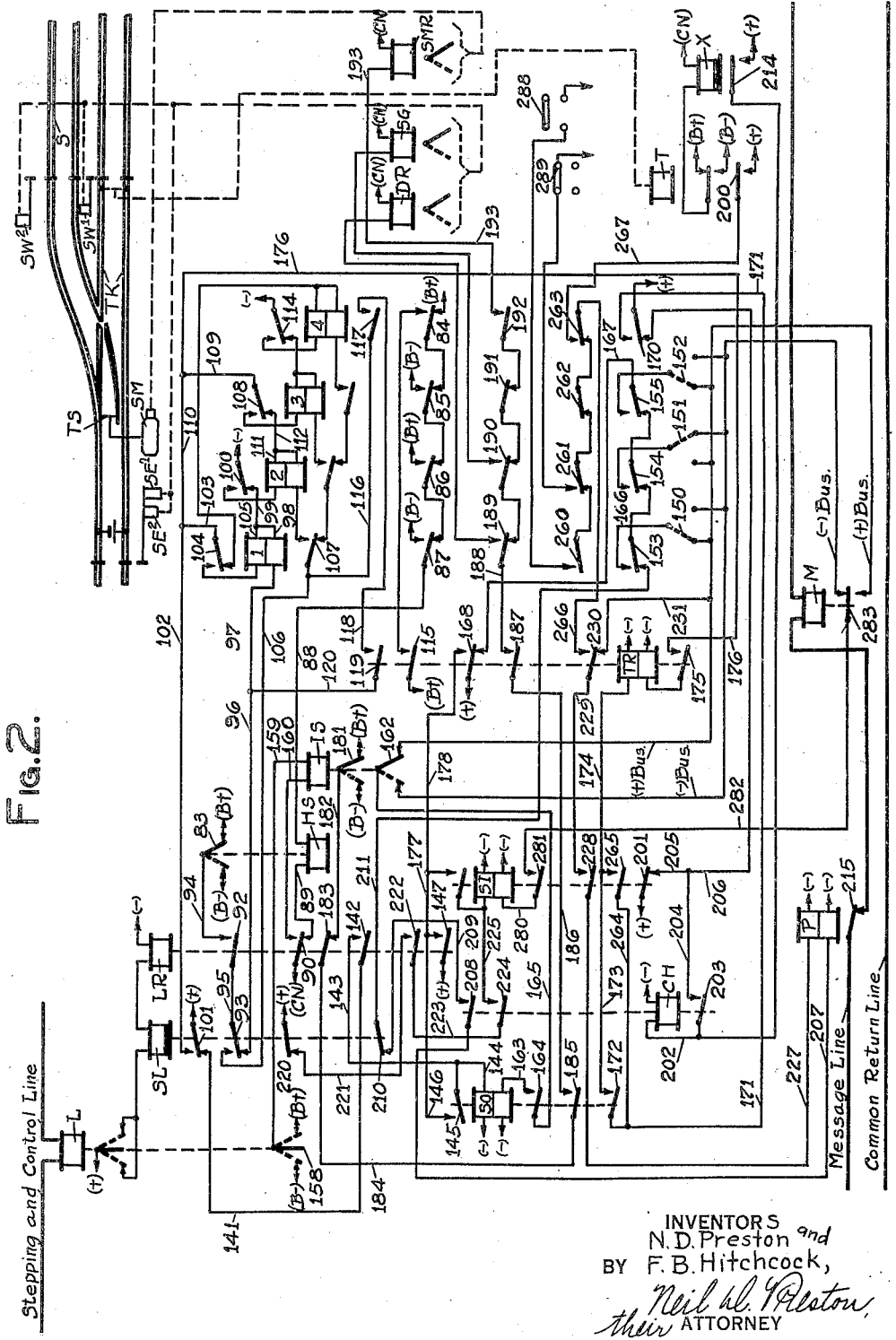

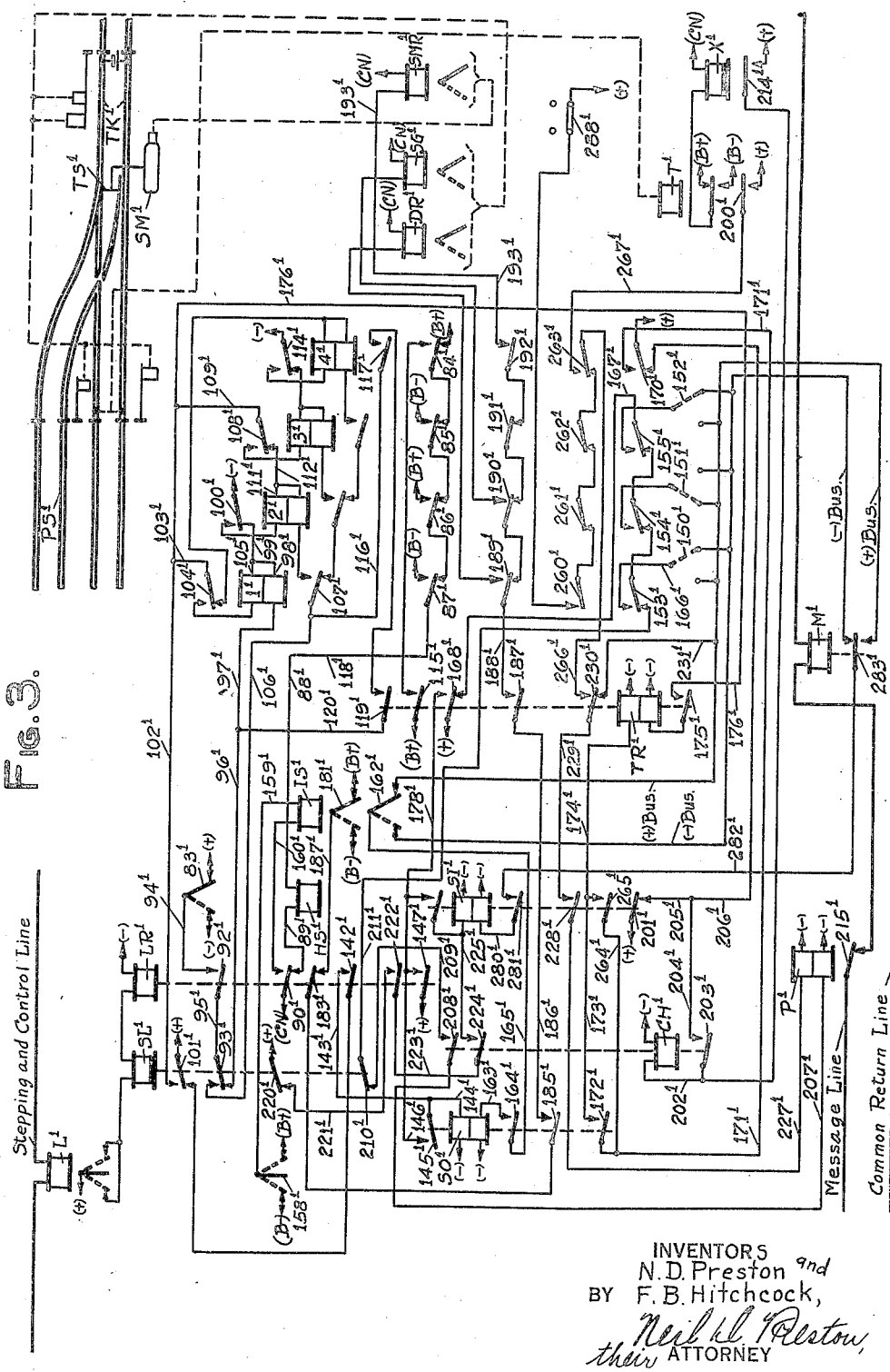

Sept. 6, 1938.   N. D. PRESTON ET AL   2,129,183
CENTRALIZED TRAFFIC CONTROL SYSTEM
Filed May 24, 1930   7 Sheets-Sheet 5
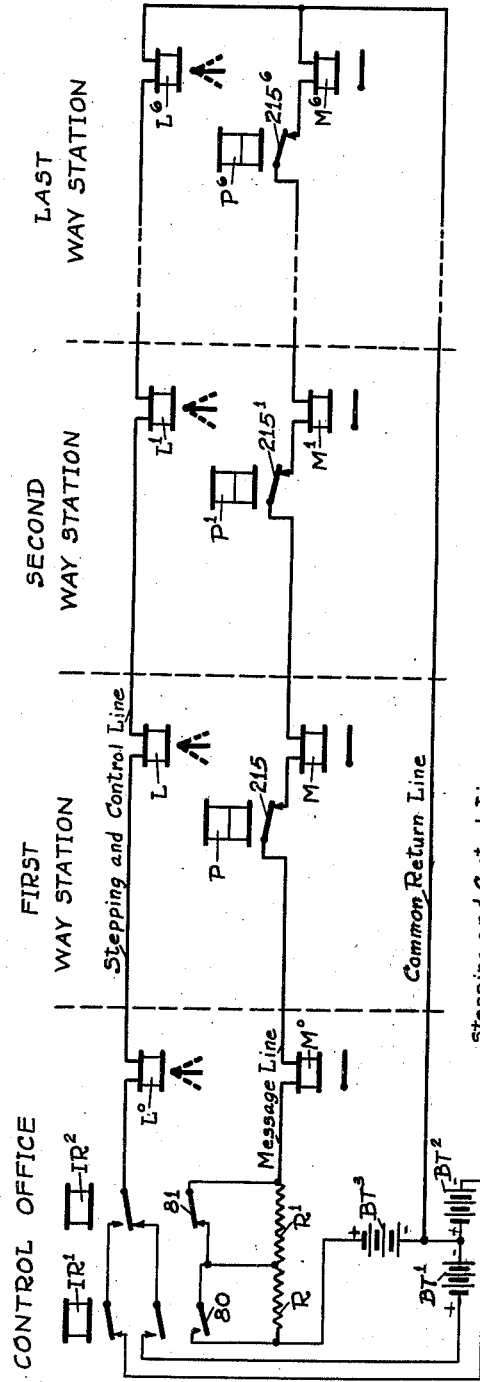
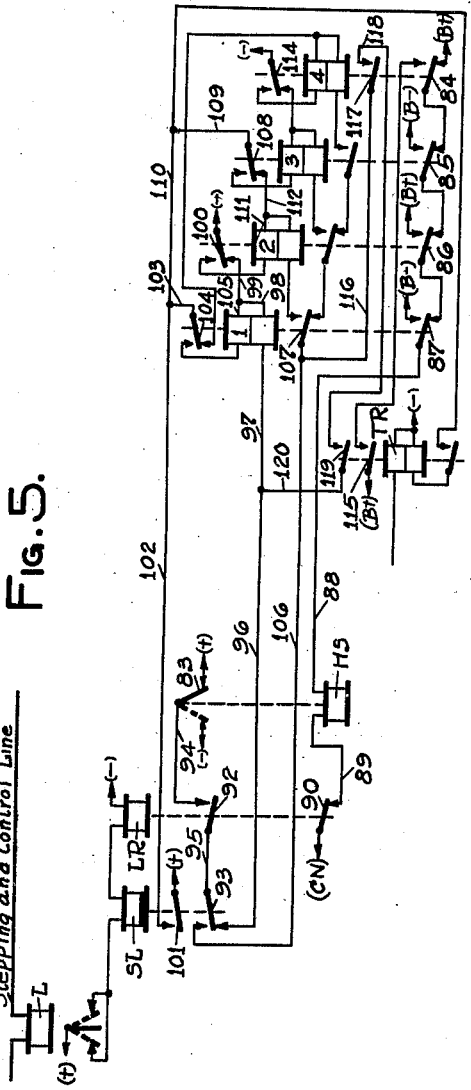
INVENTORS
N. D. Preston and
BY F. B. Hitchcock,
their ATTORNEY

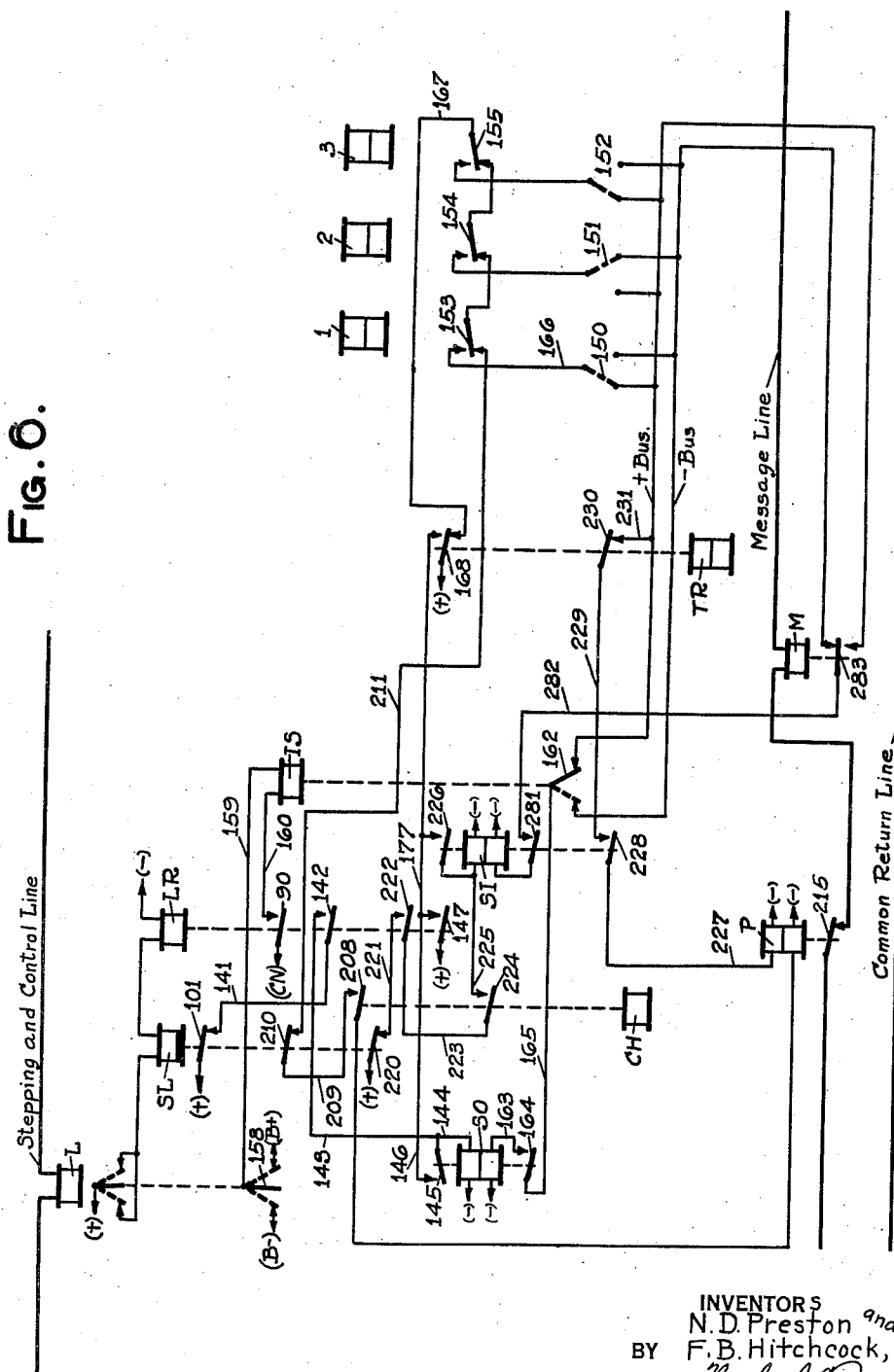

Sept. 6, 1938.  N. D. PRESTON ET AL  2,129,183
CENTRALIZED TRAFFIC CONTROL SYSTEM
Filed May 24, 1930   7 Sheets-Sheet 7

TYPICAL CODE TABLE

| Code Call | Step One | Step Two | Step Three |
|---|---|---|---|
| 1 | + | + | + |
| 2 | + | + | − |
| 3 | + | − | + |
| 4 | + | − | − |
| 5 | − | + | + |
| 6 | − | + | − |
| 7 | − | − | + |
| 8 | − | − | − |

INVENTORS
N. D. Preston and
BY  F. B. Hitchcock,
    Neil D. Preston
their ATTORNEY Patented Sept. 6, 1938

2,129,183

UNITED STATES PATENT OFFICE 2,129,183

CENTRALIZED TRAFFIC CONTROL SYSTEM

Neil D. Preston and Forest B. Hitchcock, Rochester, N. Y., assignors to General Railway Signal Company, Rochester, N. Y.

Application May 24, 1930, Serial No. 455,304

82 Claims. (Cl. 246—5)

This invention relates to systems for handling traffic on railroads, and more particularly to a dispatching, or centralized traffic control system, by means of which a dispatcher or operator at a conveniently located control office is able to govern at will the operation of switches, signals, and the like at various points along a railroad, and is informed of the progress of trains and the operated conditions of the switches and signals.

The purpose of a dispatching or centralized traffic control system, generally speaking, is to enable the operator or dispatcher to govern train movements over that part of a railroad or territory under his supervision, without written or oral orders, by causing operation of the switches and signals at the various points in this territory, so as to permit trains to move in any way he may desire. In such a system, the various track switches, are usually operated by power, under the control of the operator, with suitable provisions for local approach locking and the like, so that the switches may not be improperly and unsafely operated; and the various signals are automatically controlled by track circuits and the positions of the switches in accordance with automatic block signaling practice, subject to the control of the operator, who may hold any signal at stop, regardless of track circuit control, or may allow any signal to clear, provided the location of trains makes it safe for such signal to clear.

In other words, a centralized traffic control system of the type contemplated by this invention may be said to comprise a signaling system, embodying the practice and safety features of automatic block signal and interlocking systems, together with a suitable communication system permitting the operator to exercise his supervisory control over the operation of the switches and signals, so as to direct the movement of the trains by the indications of the signals without orders.

The present invention relates more particularly to such a communication system, and is intended to be used in connection with a signaling system, providing the necessary block signal and interlocking protection, such as disclosed for example in the Patent No. 2,082,462 granted June 1, 1937 to N. D. Preston.

Such a communication system, constituting more particularly the subject matter of this invention is utilized to enable the operator to condition at will a relay or similar control device for each switch or signal in the territory under his supervision, in such a way that the switch may be shifted to either position, and the signal caused to indicate clear or stop, as may be desired by the operator, subject to the control of the signaling system, which prevents the switches and signals being operated unsafely. This function of the system is conveniently referred to as transmission of controls. The communication system is also used to transmit to the operator indications of the existing operated position or conditions of the switches and signals, and the presence or absence of trains in various track circuits, together with indications of such other conditions as may be of interest or value to the operator in his handling of the train movements. This function may be called communication or transmission of indications.

By way of explanation, and without attempting to define the nature or scope of the invention, it may be stated that, in the communication system of this invention, certain devices and circuits, such as are suitable for governing the operation of a single switch and associated signals, and for indicating the position of the switch, conditions of the signals, and the condition of certain track circuits, are grouped together to constitute a field or way station equipment. Communication is established between the control office and the several field stations along the railroad, over three line wires, by utilizing special combinations of current impulses in the form of a code to select the stations one at a time to receive controls set up by the operator in the control office, and/or receive in the control office from the several stations, one at a time, the indications from each station.

In sending out controls from the control office, for the purpose of governing the switch and signals at a particular station, a combination of impulses, conveniently termed a code call, which is allotted to that particular station, is transmitted over a stepping or control circuit extending to all stations, but effective response is obtained only at the particular station being called. After such selection of a station, the desired controls to that station are transmitted by impulses applied to the same stepping or control circuit. In other words, in the transmission of outgoing controls, a code system is employed for selecting the stations one at a time, and then the desired controls are transmitted to the selected station over the same stepping or control circuit.

The indications of the position of switches and signals, and the conditions of track circuits, and the like, are transmitted to the control office from the several stations one at a time. A station, having new indications to transmit, registers or identifies itself in the control office by governing the energization of a message or indication circuit in accordance with the code call belonging to that station, and then communicates the new indications over the same message or indication circuit. If it should happen that more than one station is ready to send in new indications to the control office, these stations are allowed to register themselves and communicate their indications, one station at a time, in a sequence or order determined by the characteristic of the code calls belonging to these stations.

Since, in accordance with this invention, the selection of the desired station and transmission of controls to that selected station are accomplished over a stepping or control circuit, and the registration of a station sending in indications and the communication of these indications, are obtained over a separate message or indication circuit, an important feature of the system of this invention is that, at the same time the operator may be sending out controls to some selected station, either that station or some other station may simultaneously communicate its indications to the control office.

The system of this invention may be said, therefore, to be of the duplex coded type, in that a code is employed for station selection, and there may be simultaneous two-way transmission of controls and indications to and from the same station, or different stations.

Various other characteristic features, functions and advantages of the system of this invention are more conveniently explained hereinafter, following a description of one embodiment of the invention and its mode of operation. Many of these features and advantages will be apparent as the description progresses, and need not be specifically pointed out.

For the purpose of explaining the nature of the invention, there has been shown in the accompanying drawings one typical embodiment of the invention adapted for controlling the switches and signals at the ends of passing sidings on a single track railroad; but the same principles and functions of the invention, and the same apparatus and circuits may be employed, or may be readily adapted by obvious modifications, for the control of the switches, signals, or other traffic controlling devices for all kinds of track layouts, and receiving such indications of the positions or conditions of these traffic controlling devices, track circuit occupancy, and the like, as may be desired.

In describing the invention in detail, reference will be made to the accompanying drawings, in which similar parts throughout the several views are designated by similar reference characters provided with distinctive exponents, and in which:—

Figs. 1A and 1B when placed side by side illustrate the apparatus and circuits for the control office of a communication system constructed and arranged according to the present invention;

Figs. 2 and 3 illustrate the equipments for two typical way stations of the system, having distinctive code calls for their selection;

Fig. 4 shows the arrangement of the line circuits;

Fig. 5 illustrates a typical bank of stepping relays forming a part of the system;

Fig. 6 illustrates the apparatus and circuit arrangement employed for the code selecting and code sending means of a typical way station, such as illustrated in Fig. 2;

Figures 7, 8:
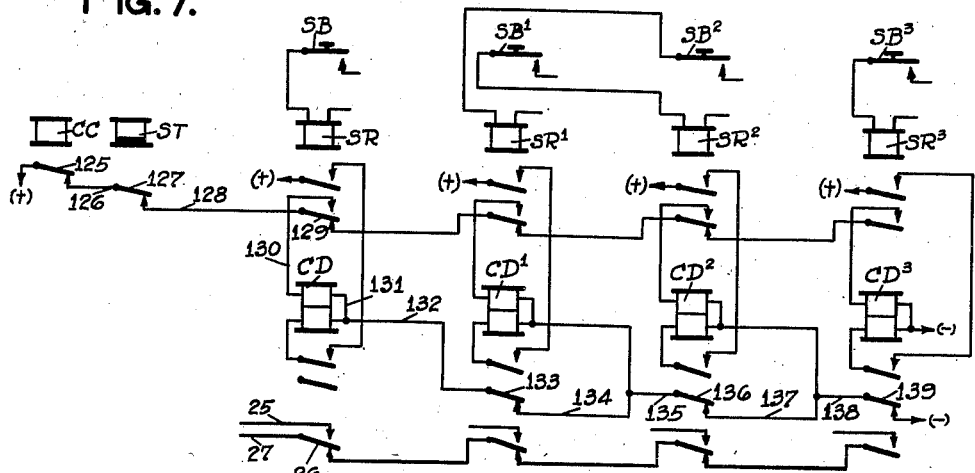
Fig. 7 illustrates a bank of interlocked relays used in the control office.
Fig. 8 shows a typical table of the code combination of impulses employed in the system.

For the purpose of simplifying the illustration and facilitating the explanation, the various parts and circuits constituting the system have been shown diagrammatically and certain conventional illustrations have been employed, the drawings having been made more with the purpose of making it easy to understand the principles and mode of operation of the system, than with the idea of illustrating the specific construction and arrangement of parts that would be employed in practice. Thus, the various relays and their contacts are illustrated in a conventional manner, and symbols are used to indicate connections to the terminals of batteries or other sources of electric current, instead of showing all of the wiring connections to these terminals.

Considering first the general organization of the system, three line wires are employed in the particular form shown, namely, a stepping and control line, a message or indication line, and a common return line. These line wires extend from the control office through the several stations, and are connected together at the end of the system beyond the last station, as shown in Fig. 4. These line wires form two separate circuits, with a common return connection, conveniently termed a stepping circuit, and a message circuit.

The stepping and control line wire includes at each station, and at the control office, a polar line relay L, as shown in Fig. 4; and the message line wire includes at each station and at the control office, a message relay M of the neutral type. A neutral pulsing relay P at each station operates a contact in the message line wire.

The stepping circuit and the message circuit are both supplied with direct current from sources located at the control office. The field stations do not supply current to the line circuits of the system. This supply of direct current in the control office for energizing the stepping and message line circuits may be storage batteries, with suitable trickle-charge or periodic charging means, or motor generators, or any other suitable source, the voltage requirements varying with the length of the line circuits and the number of stations. The resistance of the line relays L and message relays M, located in series in the stepping and message circuits, is preferably made approximately the same as the resistance of the line wire between the stations. In this connection, it may be explained that a series arrangement of the line relays L and message relays M is preferably employed so as to obtain simultaneous operation of these relays as their respective circuits are energized and de-energized; but the invention is not limited to such a series arrangement, and may be applied to a multiple arrangement of line relays.

A source of direct current is required for each field station for energizing the local circuits of the communication system, and for operating the switches and signals at that station. Storage batteries, maintained charged through rectifiers from a suitable power line, are preferably employed for this purpose, in accordance with common practice.

According to the conventional battery symbols herein used, the symbols (+) and (−) indicate connections to the opposite terminals of a battery, or other suitable source of direct current; and the circuit, with which these symbols (+), and (−) are used, is energized by a local battery, and current always flows in the same direction in the circuit when it is closed. The symbols (B+) and (B−) indicate connections to the opposite terminals of a battery or suitable source, such as the battery $BT^4$, (Fig. 1A) which has a central or intermediate tap, with the connections thereto designated by the symbol (CN). Where a circuit is marked with these symbols (B+) and (B−), it is energized from a local battery, but the direction of current flow may be reversed in the circuit.

The actual connections are shown for the batteries, or other sources of direct current, such as the batteries $BT^1$, $BT^2$ and $BT^3$ (Fig. 1B) for supplying current to the line circuits.

All of the operations of this communication system (as shown) are performed by relays, preferably of the tractive armature type. Certain of these relays, such as the line relays L, are of the three-position polarized type, the movable armature being biased by suitable means to assume an intermediate or neutral position when the relay is de-energized. When such a polar relay is energized, its armature is shifted from its neutral position to an operated position, in one direction or the other, according to the polarity of the current supplied to the relay. The contacts for these three-position polar relays are shown conventionally; and for convenience it is assumed that the contact fingers of these relays are moved to the right by positive current, and to the left by negative current. Some of the relays, such as the relays PS, HS, IS and the function control and indication relays are of the two-position polar type, their armatures each being held by the magnetic attraction of the permanent magnet of the relay in the position the armature was caused to assume upon the last energization of the relay. The contact fingers for these two-position polar relays are similarly shown conventionally, and are also assumed to move to the right for a positive energization and to the left for a negative energization.

The various neutral relays, shown conventionally, are preferably of the type commonly used in telephone practice. Some require two independent windings, and some need slow-releasing characteristics, obtained by copper slugs or short-circuited windings, in accordance with well-recognized practice, such slow-releasing relays being illustrated conventionally with heavy base lines. All of the relays are of course constructed in accordance with recognized practice to have the necessary operating characteristics, quick operation of all the relays, except the slow-releasing relays, being desirable to increase the speed of operation of the system.

*The control office equipment.*—The equipment for the control office comprises in general a suitable control machine, provided with manually operable levers, indicating lamps, and the like, so as to enable the operator by simple manipulation to control the switches, signals, or other traffic controlling devices of the system at the various field stations, and also have before him such information of the response of these traffic controlling devices to his supervisory control, and of the occupied or unoccupied condition of various track sections, as will enable him to handle the traffic expeditiously and efficiently.

No attempt has been made to illustrate the structure and arrangement of parts preferably used for such a control machine; but certain control levers and indicating lamps, with their various electrical connections, have been shown diagrammatically, as typical or representative of what could be satisfactorily employed with the communication system of the invention.

In the diagrammatic arrangement shown (see Fig. 1A), a control lever SML, movable to two positions, and operating a contact 5 is illustrated for the control of the switch at one field station. A signal control lever SGL, movable to three different positions, and having two groups of mechanically connected contacts 6 and 7 is illustrated for controlling the clearing of the signals and the direction of traffic over a switch. These two control levers SML and SGL are representative or typical of those used for each field station.

For each station, preferably located on the lever panel directly adjacent the control levers SGL or SML for the station, is a starting button SB, biased to the open position, which is momentarily actuated by the operator to send out controls to the corresponding station.

A miniature track diagram, corresponding with the actual track layout in the field of the territory under the supervision of the operator, is preferably made a part of the control machine, and positioned directly over the control levers for the several field stations. As representative of such a track diagram, there is shown in Fig. 1A, one end of a passing siding s, which is intended to represent the west end of the passing siding S under the control of the field station shown in Fig. 2.

Small indicator lamps of the telephone switchboard type, suitably disposed on this track diagram, are lighted to indicate the presence of a train on a corresponding portion of the track. An indicator lamp I, lighted when the detector track circuit at the end of the passing siding S is occupied, is typical or representative of such indicator lamps.

The positions of the switch in the field, and the indications of the signals for each station, are also preferably indicated by small indicator lamps, or the like (not shown) on the lever panel of the control machine, preferably adjacent to the respective control levers, these indications of switch and signal conditions being controlled in a manner similar to that of the OS track circuit lamp I.

Associated with the lever panel for each station is a storing relay SR, which is directly controlled by its corresponding starting button SB, and which is energized by a momentary operation of the starting button, and remains energized until the call for the corresponding station has been completed.

Associated with each storing relay SR is a code determining or selecting relay CD. These code selecting relays CD for the several stations are respectively controlled by the corresponding storing relays SR, and are arranged in a bank with interlocking circuits, so that only one of these relays CD may be energized at a time, irrespective of the number of storing relays which may be energized as a result of the operation of the starting buttons SB. These code selecting relays CD, when energized one at a time, condition the system for operation to cause transmission of a code call characteristic of the corresponding station, in a manner more fully explained hereinafter.

Directly controlled by each code selecting relay CD is a control selecting relay CLS, which serves to render the control levers SML and SGL of the corresponding station effective to control the switch and signals at that station, in the manner and for the purpose later explained.

Also associated with the lever panel for each station, is a number of polar indication relays IN, three of which are shown, one controlling the OS indication lamp I.

The control office equipment (see Fig. 1B) also includes a bank of station registering or de-coding relays, which are responsive to the code calls communicated to the control office over the message circuit from stations having new indications to transmit, such stations transmitting new indications being registered or identified one at a time on this bank of station register relays. In the particular arrangement shown, this station registering bank of relays comprises a group of pilot relays $PT^1$, $PT^2$, and $PT^3$, and a group of relays $C^1$, $C^2$, one for each station, the arrangement of relays shown being applicable for eight stations, but being capable of expansion to provide for any desired number of stations.

Thus, the control machine in the control office comprises for each field station, two levers SML, SGL, a portion of track diagram with its indicating lamps, a starting button SB, a storage relay SR, a code determining or selecting relay CD, a control selecting relay CLS, a plurality of indication relays, and a station registering relay C.

The control office equipment also includes a suitable number of counting or stepping relays, arranged in a bank and energized sequentially one at a time by the impulses applied to the stepping circuit. These stepping relays count off the steps during each operating cycle of the system. Relays are preferably employed for this purpose, but any other suitable step-by-step mechanism could be used. In the arrangement shown, providing for three station selecting steps (eight stations) and three control and indication steps, there are seven stepping relays $a$, $b$, $c$, etc. It should be understood that this is only one arrangement, and that the number of these stepping relays would be chosen in practice to fit the number of stations in use and the number of control and indication steps required for the various individual stations.

The control office equipment also includes suitable means for applying impulses of a selected positive or negative polarity, at the proper time-spaced intervals, to the stepping circuit. While a motor-driven commutator or equivalent means might be employed for this purpose, a group of slow-acting relays $IR^1$, $IR^2$, and $IR^3$ are preferably employed.

The polarity of each impulse applied to the stepping line is determined by a polarity selecting relay PS, which is in turn controlled by a code sending relay CS, which in turn is energized or de-energized on the successive steps by the particular code selecting relay CD then energized, and by the positions of the control levers SML and SGL for the associated station, in a manner more fully explained hereinafter.

The control office equipment further includes relays ST and CC for starting and stopping the system, a quick-acting line repeater relay $LR^0$, a slow-acting line repeater relay $SL^0$, a half-step relay $HS^0$, code buses 10, 11 and 12, control buses 13, 14, and 15, indication buses 16, 17, and 18, and various other bus wires and connections discussed in detail hereinafter in the description of the operation of the system.

*Field station equipment.*—Referring to Fig. 2, the switch and signals for the end of a passing siding, which are merely representative of the traffic controlling devices which may be controlled and indicated from a field station, have been shown conventionally, the main track being designated TK, the passing siding S, and the movable switch points TS.

These switch points TS are operated by a suitable switch machine, such as disclosed for example, in the patent to W. K. Howe, No. 1,466,903, dated September 4, 1923, which is supplied with operating current from the local battery, and which is preferably equipped with a dual control selector, permitting hand operation of switch points, as disclosed, for example, in the application of W. K. Howe, Ser. No. 354,039, filed April 10, 1929. The operation of this switch machine SM is controlled by a function control relay SMR of the two-position polar type, the energization of this relay being under the control of the operator through the agency of the communication system of this invention. The operation of this switch machine is also governed by suitable approach and release locking means (not shown), such as disclosed for example in the Patent No. 2,038,463 granted Apr. 21, 1936, to W. W. Wenholz et al., so that irrespective of the operation of the switch machine function control relay SMR, the switch points may not be improperly operated.

The movement of trains over this switch TS is governed by suitable signals, controlled by the track circuits, and the position of the switch points, subject to the supervisory control of the operator. As shown, signals $SE^1$ and $SE^2$ govern east-bound traffic (left to right) on the main track and onto the siding, respectively; and signals $SW^1$ and $SW^2$ govern west-bound traffic on the main track and off of the siding, respectively. The circuits for controlling these signals by track circuits and the position of the switch points are not shown, but may be of the type shown and described for example, in the patent to S. N. Wight, Patent No. 2,082,436, dated June 1, 1937. In the arrangement shown, it is contemplated that the direction of traffic over the switch will be determined by a traffic direction function control relay DR, of the two-position polar type, and the clearing of the signals will be governed by a similar relay SG, these two relays DR and SG being under the supervisory control of the operator.

As illustrative of the manner in which indications of the presence or absence of trains on track circuits may be transmitted to the control office, there is shown a track relay T, connected to the usual detector track circuit at the switch TS, together with the means for permitting the energized or de-energized condition of this relay to be indicated in the control office.

In the communication system of this invention, the equipment for each field station comprises the same arrangement of relays, the equipment for these stations differing from each merely in certain jumpers or connections which are set to fit the code call for that station. The several relays for each field station equipment are preferably housed in a single cabinet or box, with the connections to the local wiring for the switch, signals, and indication contacts of that station, established through a quickly detachable connector, so that in the case of trouble, a station unit may be quickly taken out and replaced by another unit.

To illustrate the similarity in the equipments for the several field stations, and also the differences, the various relays and connecting circuits for two stations are shown in Figs. 2 and 3, the one in Fig. 2 being assumed to provide for the control of the switch and signals at the west end of the passing siding S, and the other in Fig. 3 for the east end of the same passing siding. It will be noted that, except for certain jumper connections, hereinafter explained, the relays and their connections for these two stations of Figs. 1 and 2 are the same; and these parts are given the same reference numbers with the distinctive exponent 1 designating those of the station in Fig. 3.

This field station equipment comprises, in addi-addition to the line relay L, message relay M, and pulsing relay P, hereinbefore explained, a slow-acting line repeater relay SL and a quick-acting line repeater relay LR, these relays being energized whenever the line relay L is energized with current of either polarity. An impulse storing relay IS, of the two-position polar type, is controlled directly by the line relay L, and shifts its contacts to the right or left, depending upon whether the line relay L is energized positively or negatively.

The field station equipment also includes a bank of stepping or counting relays, energized sequentially one at a time, upon the successive energizations of the stepping circuit, irrespective of the polarity of such energization. In the arrangement shown, providing for eight field stations, and three control and indication steps, four such stepping relays 1, 2, 3, and 4 are required for each field station; but this number of stepping relays is of course merely illustrative, and will be varied in practice, in accordance with the number of stations and the number of indications and controls desired. Associated with this stepping bank of relays is a two-position polar half-step relay HS.

Each field station equipment further comprises two station selecting relays, one SO for selecting the station for outgoing controls from the control office, and the other relay SI for selecting the station when it is registered or identified in the control office and transmits indications to the control office.

A relay TR, conveniently termed a transfer relay, is energized whenever the station is selected to receive controls or to transmit indications, and this transfer relay TR, when energized, renders that station effective to receive controls, and/or transmit indications, as hereinafter explained.

The field station equipment also includes a relay CH, conveniently termed a change relay, which is automatically energized whenever there is a change in the conditions at that station requiring the transmission of new indications. In the simplified arrangement shown, this change relay CH is momentarily energized each time the detector track relay T drops or picks up; but it should be understood that the energization of the change relay CH is also made dependent upon a change in the position or condition of the other devices, such as the switch, signals, or other track circuits, which are indicated in the control office, so that the relay CH is momentarily energized whenever any new indication is to be transmitted.

With this brief explanation of the general organization of the system, it is believed that the nature of the invention, its advantages, and characteristic features, can be explained to better advantage by discussing its performance and mode of operation.

Operation of the system

Before discussing in detail the various steps in the operation of the system under different conditions, and pointing out the circuits involved, it would appear to be expedient to outline briefly the general scheme of operation.

While the system could be operating continuously, it is preferably arranged (as shown) so as to be normally at rest when no controls are to be transmitted from the control office, or no new indications are to be communicated to the control office. The relays and circuits are shown in the drawings in the positions assumed when the system is in its normal condition of rest, the stepping circuit being de-energized, and the message circuit steadily energized.

While the system is at rest, or in a so-called period of blank, it may be set into operation from the control office for the transmission of new controls to any particular field station, or may be set into operation automatically by any field station having new indications to communicate to the control office. When thus set into operation, the system goes through what is conveniently termed an operating cycle, and then comes to rest again.

During each such operating cycle, new controls may be transmitted to any station, and new indications may be received from that station, or any other station. The system continues to go through these operating cycles, transmitting controls to these stations, one at a time, and/or communicating indications to the control office from the stations, one at a time, so long as there are new controls or new indications to be transmitted.

This so-called operating cycle may be said to be divided into two parts. During the first part of the operating cycle, the station calling, and/or being called, is selected; and during the second part of the operating cycle controls are transmitted from the control office to the selected station being called, and/or indications are communicated to the control office from the selected station calling.

In describing this operation in detail, it is convenient to discuss the several steps in the operation individually under separate headings, first explaining the operation of the system in transmitting controls from the control office, then the communication of indications, first when one station alone has new indications to communicate, and second when there are several stations having new indications to communicate, and finally how the system operates in a duplex manner to transmit simultaneously on the same operating cycle both controls and indications.

*Manual starting.*—When the system is at rest, and the operator desires to transmit controls to a selected station, he actuates the starting button SB for that station, having positioned the control levers SML and SGL to provide the desired controls.

The actuation of a starting button SB closes a pick-up circuit for its corresponding storing relay SR, which in the case of the relay SR for the first station (see Fig. 1A) may be traced from (+), through the back contact 20 of the code selecting relay CLS, wire 21, relay SR, wires 22 and 23, starting button SB, to (—). The storing relay SR is stuck up by a preliminary stick circuit through its front contact 24 and the back contact 20 of the corresponding control selecting relay CLS.

Disregarding for the present the provisions made for calling the field stations, one at a time, in a predetermined order, in case several starting buttons SB are actuated simultaneously or in rapid succession, and assuming that the starting button SB for the first station is the only one then actuated, and that no other starting buttons have been actuated for some time, then the energization of the storing relay SR at once picks up its corresponding code determining relay CD and holds up this relay CD as long as the relay SR is energized, over pick-up and stick circuits more conveniently discussed hereinafter in describing the sequence of station selection for transmitting controls.

When the relay CD for the station in question is thus energized, it picks up its corresponding control selecting relay CLS by a circuit which is traced from (—), relay CLS, wire 25, front contact 26 of relay CD, wires 27, 28, 29 (Fig. 1B), back contact 30 of stepping relay g, to (+). This establishes a stick circuit for the relay SR under consideration, from (—), front contact 24 of relay SR, wires 31 and 22, relay SR, wire 21, front contact 20 of relay CLS, wires 32, 28 and 29, the back contact 30 of the last stepping relay g, to (+). In this way, the storage relay SR is maintained energized until the end of the operating cycle.

When the code determining relay CD is energized, the system being at rest at this time, the starting relay ST is energized over a circuit from (+), through the back contact 33, to relay SL (see Fig. 1B), wire 34, relay ST, starting bus 35, front contact 36 of the relay CD, to (—).

This energization of the starting relay ST at once picks up the cycle control relay CC over a circuit through the front contact 37 of the relay ST, which may be readily traced on the drawings; and the relay CC is stuck up until the end of the operating cycle by a stick circuit from (—), relay CC, wires 38 and 39, front contact 40 of relay CC, wires 41 and 29, back contact 30 of the last stepping relay g to (+).

The energization of the relay CC starts the means for impulsing the stepping circuit, but before considering the operation of this impulsing means, it is convenient to consider how the polarity of the stepping impulses is selected.

*Polarity selection of stepping impulses.*—The system of this invention includes suitable means for energizing the stepping circuit with direct current impulses, of either positive or negative polarity, predetermined in accordance with the code call for the particular station being called, during the first or station selecting part of the operating cycle, and also predetermined in accordance with the controls to be transmitted to the selected station, during the second part of the operating cycle.

The polarity of the impulses applied to the stepping circuit is determined by a code sending relay CS and a polarity selecting relay PS. When the code sending relay CS is deenergized, as shown in Fig. 1B, the polarity selecting relay PS is energized with current of negative polarity over a circuit from (B—), back contact 42 of relay CS, wire 43, back contact 44 of relay LR⁰, wire 45, relay PS, to (CN). The relay PS is assumed to position its polar contact to the left, when thus energized with current of negative polarity, to cause the next impulse applied to the stepping circuit to be of negative polarity, in a manner presently to be explained. If the relay CS is energized, then the relay PS is energized with the opposite positive polarity, and its polar contact shifts to the right, causing the next impulse applied to the stepping line to be a positive impulse.

The code sending relay CS is energized or de-energized to select the desired polarity of the impulses for the station selecting part of the operating cycle by energizing or de-energizing code buses 10, 11 and 12. When the system is at rest, the relay CS is connected to the code bus 10 through the back contacts 46, 47, 48, 49, 50 and 51 of the stepping relays a to f, and it can be readily seen that if this bus 10 is energized, the relay CS is picked up, and the first impulse applied to the stepping line will be positive, while if the bus 10 is de-energized, the relay CS is in turn de-energized, and the first stepping impulse will be negative.

When the first impulse is applied to the stepping circuit, the stepping relay a is picked up, irrespective of the polarity of this impulse, in a manner later to be explained, and this connects the relay CS through the front contact 46 of the stepping relay a to the code bus 11. If this code bus 11 is energized, the next or second impulse applied to the stepping circuit will be positive, while if this bus 11 is de-energized, this second impulse will be negative. On the second impulse the stepping relay b picks up and the stepping relay a drops, connecting the relay CS to the code bus 12, which in the same way determines the polarity of the next or third step, depending upon whether this code bus 12 is energized or de-energized.

The code buses 10, 11 and 12 are selectively energized or de-energized, to provide the desired code call, by the code selecting or determining relays CD, these code buses being connected to front contacts of the several relays CD through jumpers or connectors, which are different for the different relays. If the relay CD, for example, is picked up by actuation of the starting button SB to send out a code call for the first station, the code buses 10 and 12 are energized through the front contacts 52 and 53, jumpers 54 and 55, while the code bus 11 is de-energized, providing a code call which may be designated (+) (—) (+).

In the arrangement shown, providing for three station selecting steps, or a selection of any one of eight stations, only three code buses 10, 11 and 12 are required; but it should be understood that additional code buses, similarly controlled by the contacts of the stepping relays a, b, c, etc., would be provided for a larger number of stations.

On the last station selecting step (which is the third step in the arrangement shown), the code sending relay CS is connected, through the front contact 48 of the stepping relay c, to the first control bus 13, on the next step to the control bus 14, and so on for as many steps as may be required for controls and indications. These control buses are connected through front contacts of the particular control selecting relay CLS then energized in correspondence with the station receiving the code call, to the control levers for that station. Thus, if the control selecting relay CLS for the first station is energized by the picking up of the relay CD for that station, then the control bus 13 is connected to the switch control lever SML, and is energized with that lever in one position, as shown, and is de-energized with that lever in the other position. Similarly, the control buses 14 and 15 are connected to the contacts of the signal control lever SGL, so as to be respectively energized or de-energized in accordance with the position of this lever, so as to clear the signals in the direction of traffic desired, or hold them at stop.

*Impulsing means.*—Having explained how the polarity of the impulses applied to the stepping circuit is determined or selected in accordance with the code call for the particular station being called, and in accordance with the particular controls desired for that station, consideration may now be given to the operation of the means for applying these impulses to the stepping circuit at the proper time-spaced intervals.

This impulsing means is arranged to apply a current of the selected polarity, to the stepping circuit for a predetermined time interval, conveniently termed the operating or conditioning period, and then de-energize the stepping circuit for another predetermined time interval, conveniently termed the execution or message period. When the system is at rest, the first impulse is made long to mark the beginning of an operating cycle.

Assuming the system to be at rest, the relay CS de-energized, and the polar contact of the relay PS in the left-hand position shown, making the first impulse negative, when the relay CC is energized to start the system, as previously explained, the relay $IR^2$ is energized by a circuit from (+) through the front contact 56 of relay CC, wire 57, back contact 58 of relay $IR^3$, wire 59, polar contact 60 of relay PS, wire 61, relay $IR^2$, wire 62, and back contact 63 of relay $IR^1$, to (−).

The picking up of relay $IR^2$ establishes a circuit for applying a negative impulse to the stepping circuit from the battery $BT^1$, wire 65, back contact 66 of relay $IR^1$, wire 67, front contact 68 of relay $IR^2$, wire 69, line relay $L^0$, stepping line through the several line relays $L^0$ at the several stations and back to the battery $BT^4$ over the common return wire (see Fig. 4).

If the relay CS is energized over the code bus 10, when the system is starting from rest, then the polar contact of relay PS is in the right-hand or positive position, and the relay $IR^1$ is picked up to apply a positive impulse to the stepping circuit from the battery $BT^2$, the circuit for this being readily traced by analogy to the circuit for the negative impulse above traced.

This first impulse on the stepping circuit energizes the line relay $L^0$, and whether positive or negative, the relays $SL^0$ and $LR^0$ are energized. The energization of the relay $LR^0$ results in picking up the stepping relay *a* to shift the control of the relay CS from code bus 10 to code bus 11, but the relay PS is not operated, the back contact 44 of the relay $LR^0$ being open. After this first impulse, during the execution or the message period, and before the next impulse, the relay PS is energized in correspondence with the relay CS and predetermines the polarity of the next step.

The first impulse should be maintained on the stepping line long enough to assure energization of the relays SL at the several stations. When the stepping circuit is energized long enough, the relay $SL^0$ closes its front contact and establishes a circuit for energizing the relay $IR^3$ from (+), front contact 33 of relay $SL^0$, wires 72 and 73, through the front contact 74 or 75 of the relay $IR^1$ or $IR^2$, as the case may be, wire 76, relay $IR^3$, to (−). The relay $IR^3$, being slow-acting, picks up after a short interval of time, and breaks at its back contact 58 the energizing circuit for either the relay $IR^1$ or $IR^2$, as the case may be. This de-energizes the relay $IR^1$ or $IR^2$, whichever may be picked up, and cuts off the current to the stepping line.

The time during which the stepping circuit is energized by this first impulse, is measured by the pick-up time for the relay $SL^0$, the pick-up time for the relay $IR^3$, and the drop-away time for either the relay $IR^1$ or $IR^2$.

When either the relay $IR^1$ or $IR^2$ opens its respective front contact 78 or 66 to cut off the supply of current to the stepping circuit, it de-energizes at the same time the relay $IR^3$. When the relay $IR^3$ closes its back contact 58, either the relay $IR^1$ or relay $IR^2$ is energized, depending upon the position of the polar contact 60 of the relay PS, for applying the next stepping impulse to the stepping circuit.

This same impulsing operation continues so long as the relay CC is energized, the impulses being of a predetermined duration, with a predetermined intervening interval of de-energization of the stepping circuit.

Disregarding the first stepping impulse, which is longer than the others, because the relay $SL^0$ must pick up, the time period during which the stepping circuit is energized, constituting the operating or conditioning period, is measured by the pick-up time for relay $IR^3$ and the drop-away time for either relay $IR^1$ or $IR^2$. The time interval during which the stepping circuit is de-energized is measured by the drop-away time for the relay $IR^3$ and either the pick-up time of relay $IR^1$ or $IR^2$. It is, of course, to be understood that these slow-acting relays $IR^1$, $IR^2$ and $IR^3$ are so constructed and adjusted as to provide the proper time intervals for the proper functioning of the system. Generally speaking, as will be evident as soon as the operation of the system is understood, the stepping circuit should be energized longer than it is de-energized, since more operations have to take place during the operating or conditioning period as determined by its energization, than have to occur during the execution or message period as determined by its de-energization.

Referring to Fig. 4, it will be evident that, as the polarity of the current in the stepping circuit is reversed, the drop of potential in the common return wire will either oppose or help the voltage of the battery $BT^3$ for the message circuit, according to the polarity of the stepping current. In order to maintain substantially the same current in the message circuit under the different conditions, resistances R and $R^1$ are preferably included in the message circuit and shunted respectively by a front contact 80 of the impulsing relay $IR^1$, and a back contact 81 of the other relay $IR^2$. When the stepping circuit is de-energized, as shown in Fig. 4, the resistance R is included in the message circuit; when relay $IR^1$ picks up to apply a positive impulse to the stepping circuit, both resistances R and $R^1$ are shunted, this being the condition where the resistance drop in the common return line opposes the battery $BT^3$, according to the polarities shown; and when relay $IR^2$ picks up to apply a negative impulse to the stepping circuit, both resistances R and $R^1$ are included in the message circuit, this condition being the one where the resistance drop in the common return wire helps the battery BT³. In this way, by properly proportioning the values of the resistances R and R¹ in accordance with well-known electrical laws, substantially the same current intensities may be maintained in the stepping and message circuits regardless of the polarity relations of the batteries in these circuits.

*Operation of the stepping relays.*—Having explained how the stepping circuit may be energized at the proper time-spaced intervals with impulses of a selected polarity, attention may now be directed to the operation of the banks of stepping relays located in the control office and at each field station. The operation of these banks of stepping relays is the same, and an explanation of one will suffice for all. In describing this operation, reference is conveniently made to Fig. 5, which shows separately the circuits for the station bank of stepping relays.

The energization of the line relay L in the control office and at each field station, which occurs simultaneously since these relays are in series, is likewise simultaneously repeated by a quick-acting line repeater relay LR, which is energized on each impulse regardless of its polarity. The slow-acting relay SL, in series with the relay LR, is also energized on each impulse, attracting its armature to close its front contacts on the first long impulse, and being sufficiently slow-releasing so as to maintain its front contacts closed on the succeeding impulses, until at the end of the operating cycle, the stepping circuit is de-energized long enough to permit the relays SL to release their armatures.

With the system at rest in the period of blank, as shown in Fig. 5, the half-step relay HS is energized with current of positive polarity, causing its contact 83 to assume the right-hand position, over a circuit from (B+), through the back contacts 84, 85, 86 and 87 of the stepping relays 1 to 4, wire 88, relay HS, wire 89, back contact 90 of relay LR, to (CN).

On the first long impulse, when the relay LR closes its front contact 92, and before the relay SL has time to open its back contact 93, a pick-up circuit for the stepping relay 1 is closed from (+), through the polar contact 83 of the relay HS, wire 94, front contact 92 of relay LR, wire 95, back contact 93 of relay SL, wires 96 and 97, lower winding of relay 1, wires 98 and 99, back contact 100 of relay 2, to (—).

When the relay SL picks up and closes its front contact 101, a stick circuit is established for relay 1 from (+), front contact 101 of relay SL, wires 102 and 103, front contact 104 of relay 1, upper winding of relay 1, wires 105 and 99, back contact 100 of relay 2, to (—). The back contact 93 and front contact 101 of the relay SL are preferably so adjusted as to make-before-break, so that this stick circuit for relay 1 is established before its pick-up circuit is broken.

When the relay SL picks up on this first long impulse, a conducting path is established from (+), through polar contact 83 of relay HS, wire 94, front contact 92, wire 95, front contact 93 of relay SL, wire 106 through the front contact 107 of relay 1 to the lower winding of stepping relay 2; but since the other side of the lower winding of this relay 2 is connected through the back contact 108 of relay 3, to wires 109, 110 and 102 leading to (+), there is no operating current in this circuit, and irrespective of the duration of the impulse, relay 2 is not energized.

When the stepping circuit is de-energized after the first long impulse, relay LR drops and closes the energizing circuit for the relay HS, which now includes the front contact 87 of relay 1, connected to (B—), so that the polar contact of this relay HS is shifted to the left-hand position.

Upon the second impulse, irrespective of its polarity, when the relay LR picks up, the energizing circuit for the lower winding of relay 2 is established from (—), through the polar armature 83 of the relay HS which is now in its left-hand or negative position. As soon as the relay 2 picks up, it is stuck up by a circuit from (—), through its front contact 109, upper winding of relay 2, wires 111 and 112, back contact 108 of relay 3, wires 109, 110 and 102, front contact 101 of relay SL to (+).

When the relay 2 opens its back contact 100, it breaks the stick circuit for the relay 1 and causes it to close its back contact, a conducting path is then established to the lower winding of relay 3, but since the opposite side of this winding is connected to negative (—), there is no operating potential to pick up relay 3.

When the stepping circuit is de-energized after the second impulse, the armature 83 of the half-step relay HS is shifted back to the right-hand position, since it is energized from (B+), through the front contact 86 of relay 2 and back contact 87 of relay 1. Consequently, on the third impulse, relay 3 is picked up, dropping relay 2, and is stuck up through its front contact 108 and the back contact 114 of the next stepping relay 4.

The same plan of operation and the same scheme of circuits may be extended for any desired number of steps.

In the arrangement shown, proving for three station selecting steps, four stepping relays are required at each field station; and after the fourth step, unless the transfer relay TR is energized on account of the selection of that particular station in a manner later to be explained, the stepping operation stops at the relay 4, which remains stuck up until the end of the operating cycle. If, however, the transfer relay TR is energized on the fourth step, then the relay HS is energized positively through the front contact 115 of the relay TR and front contact 84 of relay 4, so that the polar contact of the relay HS is properly positioned to energize relay 1 on the fifth step, the circuit for supplying current to the lower winding of the relay 1 on this fifth step being from (+), polar contact 83 of relay HS, wire 94, front contact 92 of relay LR, wire 95, front contact 93 of relay SL, wires 106 and 116, front contact 117 of relay 4, wire 118, front contact 119 of relay TR, and wires 120 and 97 to the lower winding of relay 1.

Thus, if the relay TR at the field station is energized on the fourth step (next step after the last station selecting step), then the stepping relays will operate the second time through, and also would continue to operate as long as impulses are applied to the stepping circuit. If, however, the relay TR at a station is not picked up, the stepping operation stops at the fourth stepping relay, there being no circuit to again pick up the relay 1 of the stepping bank.

In short, if a station is selected, its stepping bank of relays operate the second time with the transfer relay TR energized; but if the station is not selected, its stepping bank of relays locks up on the fourth step, and remains in that condition until the period of blank at the end of that particular operating cycle.

It may be stated here that the stepping bank of relays in the control office does not repeat, and also that this repeat operation is for the purpose of economizing in the number of stepping relays required for the field stations, and need not be used, if extra stepping relays for the control and indication steps be provided in the field stations, with provision for the energization of a relay, like the TR relay, to permit these additional stepping relays to operate or be effective in operating when the station is selected.

*Sequence of station selection for transmitting controls.*—It will be evident that only one combination of positive or negative impulses, constituting a code call to select a particular station, can be applied to the stepping circuit on any one operating cycle. In other words, the code calls can be applied to the stepping circuit only one at a time, otherwise false or mutilated codes would be transmitted, and the wrong station selected.

The operator might be relied upon to actuate the starting buttons for the several stations only one at a time, so as to avoid such mutilation or interference of the code calls; but according to this invention, provision is made so that the code calls are automatically sent out to these stations, one at a time on each operating cycle, regardless of how the operator may manipulate the control levers and starting buttons. With such an arrangement, the operator can devote his attention to the handling of traffic, and is not required to keep count of the operating cycles of the communicating system.

For each lever panel, corresponding to one of the field stations, there is a starting button SB, together with a storage relay SR, code determining relay CD, and a control selecting relay CLS. The actuation of any starting button SB at once energizes its corresponding storage relay SR, irrespective of the sequence in which several starting buttons may be actuated. The code determining relays CD, however, are interlocked, as illustrated in Fig. 7, so that only one relay CD may be energized at a time, irrespective of the number of relays SR that may be then energized.

Referring to Fig. 7, the pick-up circuit for the relay CD may be traced from (+), back contact 125 of the relay CC, wire 126, back contact 127 of relay ST, wire 128, front contact 129 of relay SR, wire 130, upper winding of relay CD, wires 131 and 132, back contact 133 of relay $CD^1$, wires 134 and 135, back contact 136 of relay $CD^2$, wires 137 and 138, back contact 139 of relay $CD^3$, to (—). The pick-up circuit for the next relay $CD^1$ includes the back contact 129 of the relay SR.

Thus, the pick-up circuit for a given relay CD in the bank includes, in addition to the front contact of its corresponding relay SR, back contacts of the relays SR in the bank to the left of it, and the back contacts of the remaining relays CD in the bank to the right of it.

Consequently, only one relay CD may be energized at a time. For example, if relay CD is picked up, the remaining relays $CD^1$, $CD^2$, etc. in the bank to the right of it cannot be picked up, because their pick-up circuits are broken at the back contact 129 of relay SR. If, however, relay $CD^3$, for example, should be first energized, then the remaining relays CD and $CD^1$ to the left of the bank could not be energized, their pick-up circuits being broken at the back contact 139 of the relay $CD^3$.

If several of the storage relays SR are energized in rapid succession, by operation of their corresponding starting buttons, the relay SR first energized will pick up its corresponding relay CD, but thereafter the other relays CD will pick up in sequence from left to right, as will be evident from a study of the circuits shown in Fig. 7. This means that, if the operator actuates several starting buttons simultaneously or in rapid succession, the stations are called in an order or sequence determined by the location of the relay CD, for each of these stations, in the bank of relays.

While these relays CD, as above explained, will be energized in sequence from left to right, the starting buttons for the several stations may be connected to the relays SR in any desired order. For example, as shown in Fig. 7, the starting button $SB^2$ associated with the lever panel for the third station from the left on the control machine, and consequently belonging to the third field station out from the control office, may be connected to the relay $SR^1$, and the second starting button $SB^1$ connected to the relay $SR^2$, with the result that the third station from the control office would be called before the second station, in the event that the starting buttons for these stations are actuated by the operator simultaneously or in rapid succession with other starting buttons.

Consequently, by pre-selecting the connections between the starting buttons SB, associated with the several stations, and the relays SR controlling the code determining relays CD, provision may be made to call the stations in any desired sequence or order, independent of the geographic locations of the stations or the positions of their control levers and starting buttons on the control machine, in the event that calls to these stations are stored by actuation of the starting buttons simultaneously or in rapid succession. This feature of the invention (which is of course optional), makes it unnecessary for the operator to pay any attention to the order to which he actuates the starting buttons, the system automatically calling the stations, one at a time, in some pre-selected sequence, in accordance with the importance of the station.

*Station selection for controls.*—When controls are to be transmitted from the control office to the field stations, these stations are selected one at a time in accordance with the combination of positive and negative impulses applied to the stepping circuit. As above pointed out, each impulse on the stepping circuit, irrespective of its polarity, energizes the corresponding one of the stepping relays at all of the stations. Since the polarity of the impulse causing each step may be made either positive or negative, a number of different combinations of positive and negative impulses may be obtained, depending upon the number of steps, thereby providing a number of distinctive code calls, each one of which may be assigned to a different one of the field stations.

As illustrative of the way in which positive and negative impulses may be combined to form a number of distinctive code calls for several field stations, there is shown in Fig. 8 a typical code table of the eight different combinations or code calls which may be obtained on three station selecting steps. In this type of code, sometimes known as the Baudot code, a choice of a positive or a negative impulse on each of three steps gives eight different combinations of impulses or code calls, four steps give sixteen different code calls, five steps give thirty-two different code calls; and so on, each additional step doubling the number of possible distinctive code calls.

Upon referring to the code table shown in Fig. 8, it will be noted that in this type of code the impulse on the first step is positive for one-half of the total number of code calls, and negative for the other half, so that a selection is made between half of the total number of stations on the first step, depending upon whether it is a positive or a negative impulse. Similarly, on the second step, a selection is made between half of the stations remaining after the first selection, depending upon the polarity of the second impulse, leaving only one-quarter of the total number of stations. On the third impulse, the selection is carried to one-eighth of the total number, and so on. In other words, on the first step, half of the total number of stations of the system may be selected, and the other half discarded, and the process of sub-dividing by two continued until the desired individual station is selected.

Considering now how the apparatus at the several field stations functions to select these stations one at a time, in accordance with this code, and referring particularly to Fig. 6 (which shows separately the relays and circuits involved in this operation), on the first impulse at the beginning of each cycle of operation, the station selecting relay SO is picked up at each of the field stations by a circuit from (+), back contact 101 of relay SL, wire 141, front contact 142 of relay LR, wires 143 and 144, upper winding of relay SO, to (−). This circuit is established only temporarily when the relay LR picks up and before the relay SL picks up.

As soon as the relay SO is energized, it is stuck up as long as this first impulse is applied to the stepping circuit, by a stick circuit from (−), through upper winding of relay SO, front contact 145 of relay SO, wire 146, front contact 147 of the relay LR, to (+).

These station selecting relays SO, thus picked up at all of the stations on the first impulse, are automatically de-energized in groups on the successive steps, with the exception of the one particular station being called. The circuits for accomplishing this are similar at the several stations, the only difference being in the positioning of jumpers or connectors 150, 151 and 152 which connect bus wires, designated "(+) bus" and "(−) bus" to the front contacts 153, 154 and 155 of the stepping relays 1, 2, and 3 respectively. A connection to the "(+) bus" corresponds to a (+) in the code table of Fig. 8, whereas a connection to the (−) bus corresponds to a (−) in this table. Thus, if the jumpers 150, 151 and 152 for a station are positioned, as shown in Figs. 2 and 6, the code call to which that station responds is (+) (−) (+); and if the jumpers are positioned as shown in Fig. 3, the code call is (−) (+) (−).

By referring to the code table of Fig. 8, it can be readily seen that the jumper 150 for the first step will be positioned so as to establish the connection to the (+) bus at half of the total number of stations, and to the (−) bus at the other half. Similarly, half of the stations having the jumper 150 for the first step connected to a "(+) bus", or one fourth of the total stations, will have the jumper 151 for the second step connected to the (+) bus, and so on.

Each time the stepping circuit is energized, an impulse storing relay IS of the two-position polar type is energized with one polarity or the other, depending upon the polarity of the impulse, over a circuit from (B+) or (B−), polar contact 158 of line relay L, wire 159, relay IS, wire 160, front contact 90 of relay LR, to (CN).

Thus, upon each energization of the stepping circuit, the polar contacts of the impulse storing relays IS are positioned in accordance with the polarity of that impulse, and remain in that position during the following execution or message period, and until the stepping circuit is again energized.

If the first impulse is positive, when the stepping relay 1 picks up at all of the stations, and the polar contact 162 of the relay IS at these stations assumes its right-hand position in response to the positive polarity of the first impulse, then a selecting stick circuit is established through the lower winding of the relay SO at all of the stations having a code call beginning with (+), but is not established at the stations having a code call beginning with a (−).

Referring to Fig. 6, this selecting stick circuit for the relay SO is traced from (−), the lower winding of relay SO, wire 163, front contact 164 of the relay SO, wire 165, polar contact 162 of relay IS to the right, "(+) bus", jumper 150, wire 166, front contact 153 of stepping relay 1, back contacts 154 and 155 of stepping relays 2 and 3 respectively, wire 167, back contact 168 of transfer relay TR, to (+).

At all of the other stations having a code call beginning with (−), this selecting stick circuit for the relay SO is not established, the polar contact 162 of the relay IS at each of these stations being in the right-hand position, connecting the stick circuit for the lower winding of the relay SO to the "(+) bus", whereas the jumper 150 at these stations is connected to the "(−) bus".

Consequently, when the stepping circuit is de-energized after this first positive impulse, to constitute the message or execution period for the first step, and when the relay LR drops at all of the stations and breaks the stick circuit through the upper winding of its relay SO, the relay SO at each of the stations having a code call beginning with (+) is held up by its selecting stick circuit, above traced, while the relays SO at all of the stations having a code call beginning with a (−), are de-energized.

In this way, a selection is made on the first step of one-half of the total number of stations, depending upon the polarity of this first impulse, and after this first impulse, the station selecting relays SO are energized at half of the stations, and de-energized at the other half of the stations.

On the second impulse, when the relay LR picks up at all of the stations, it closes a stick circuit through the upper winding of each of the station selecting relays SO then energized, holding up these relays SO, independently of the selecting stick circuits through their lower windings, so long as the stepping circuit is energized. On this second impulse, the stepping relay 2 picks up, and the stepping relay 1 drops, forming another selecting stick circuit for the relay SO, through the jumper 151 and front contact 154 of the stepping relay 2, and through the polar contact 162 of the relay IS positioned in accordance with the polarity of this second impulse. If this second impulse is of a positive polarity, then such a selecting stick circuit is established for the relay SO, if then energized, at those stations having a code call with a (+) on the second step; and such a selecting stick circuit is not established for such a positive impulse on the second step at those stations whose code call has a negative (−) on the second step.

During the execution period, following the second impulse, the station selecting relays SO of those remaining after the first impulse, drop at those stations whose code call does not fit the polarity of this second impulse, leaving the station selecting relays SO energized only at one-fourth of the total number of stations.

The same process of selection may be carried out for as many steps as desired, depending upon the number of stations, until finally the station selecting relay SO is energized at the one selected station only.

In considering this operation of station selection, it will be noted that, during the conditioning period on each impulse, the polar contact 162 of the impulse storing relay IS at each station is positioned in accordance with the polarity of this impulse, the next stepping relay is picked up, and the stepping relay energized on the next preceding step is dropped, setting up conditions for establishing a selecting stick circuit for the relay SO. Each relay SO then energized is held up during each conditioning period by the stick circuit through its upper winding and front contact of the relay LR. Following this conditioning period for each impulse, and upon de-energization of the stepping circuit to mark the beginning of the execution period, each relay SO then remaining energized is either maintained energized or de-energized, depending upon whether or not the code call for its station matches the polarity of the impulses previously taken. This segregation of the operation into conditioning and execution periods is necessary in order that the station selecting relays SO may be positively and definitely de-energized, or maintained energized, on the successive steps.

The station selecting relay SO at any station can be picked up only at the beginning of an operating cycle, through the back contact 101 of relay SL, and front contact 142 of relay LR. Consequently, if any relay SO is de-energized during the execution period of any step, due to the failure to establish its selecting stick circuit, this relay SO remains de-energized throughout the remainder of that particular operating cycle.

This scheme or method of selection may be said to be on the sub-division basis. At the beginning of each operating cycle for outgoing controls, a station selecting relay SO is energized at all of the stations. During the execution period, following the first impulse, these relays SO at half of the total number of stations are dropped out, depending upon the polarity of the first impulse. During the execution period, following the second impulse, the relays SO at half of the half remaining at the end of the first impulse are dropped out, depending upon the polarity of the second impulse; and the same process of dividing by two continues until only one relay SO is energized at the one particular station being called.

As shown in Figs. 2 and 3, the equipment for each field station involves the same arrangement of relays and circuits, and this equipment is made responsive to a particular code call merely by changing the position of the jumpers 150, 151 and 152. These jumpers or connectors may be shifted on the unit box or cabinet housing each particular field equipment, when this cabinet is put in at a station originally, or to replace a defective unit, so as to fit the code call assigned to the station at which it is located; or the connections established by the jumpers 150, 151 and 152 may be made a part of the local wiring for the station which is coupled to a unit box or cabinet by quickly detachable connectors. With either arrangement, in case of trouble, a complete unit equipment for a field station can be easily and quickly exchanged, thereby avoiding the delay to train movement which might otherwise occur, if the individual relays and circuits of the field equipment had to be inspected and repaired.

*Transmission of controls.*—After the selection of the station being called during the first part of the operating cycle, as just explained, the desired controls are transmitted to that selected station during the next or second part of the operating cycle. All of the controls for a field station are preferably transmitted during each operating cycle, rather than individually or in groups on different operating cycles, since a change frequently has to be made in all of the controls for a field station at the same time. It is obvious, however, that the controls for a field station may be transmitted individually, or in groups, selectively on different operating cycles, instead of altogether as one group on one operating cycle.

After the last station selecting step (assumed to be three in the arrangement shown), there is only one station selecting relay SO energized at the particular station being called.

When the stepping relay 4 is picked up on the next (fourth) impulse, the transfer relay TR at this selected station having its relay SO energized, is picked up by a circuit from (+), through the front contact 170 of stepping relay 4, wire 171, front contact 172 of relay SO, wires 173 and 174, upper winding of TR, to (—). The relay TR is stuck up from (—), through its lower winding, front contact 175, wires 176, 110 and 102, front contact 101 of relay SL, to (+). This stick circuit is completed until the end of the operating cycle.

When the relay TR picks up it establishes a stick circuit through the upper winding of the relay SO from (—), upper winding of relay SO, wire 144, front contact 145 of relay SO, wires 146, 177 and 178, front contact 168 of relay TR, to (+), thereby holding up the relay SO until the end of the operating cycle. While relay TR is picking up, the relay SO is held up through its upper winding and the front contact 147 of the relay LR.

The energization of the relay TR connects the function relays DR, SG and SMR, on the successive steps, to the polar contact 181 of the impulse storing relay IS, during the respective message periods, so that these function relays may be energized positively or negatively, depending upon the polarity of the impulse applied to the stepping circuit in taking the step.

For example, assuming that the fourth impulse is positive, the polar armature of the relay IS is positioned to the right, and during the message period (stepping circuit de-energized), the switch machine control relay SMR is energized positively by a circuit which is traced from (B+), polar contact 181 of relay IS to the right, wire 182, back contact 183 of relay LR, wire 184, front contact 185 of relay SO, wire 186, front contact 187 of relay TR, wire 188, back contacts 189, 190 and 191 of stepping relays 1, 2 and 3 respectively, front contact 192 of stepping relay 4, wire 193, relay SMR, to (CN).

As previously explained in discussing the operation of the stepping bank of relays, with the transfer relay TR energized, the stepping relay 1 is picked up on the fifth impulse, and this connects the function control relay DR to the polar contact 181 of the relay IS during the message period, so that the relay DR is energized positively or negatively, to set up the desired direction of traffic depending upon whether the fifth impulse was (+) or (—). On the sixth step, the stepping relay 2 is energized for the second time, providing for the control of the function relay SG. In the same way, any desired number of controls may be transmitted on successive steps, in accordance with the polarity of these steps.

An important feature of this operation is that the positioning of the polar contacts 181 and 162 of the impulse storing relay IS takes place during the conditioning period of energization of the stepping circuit, while the positioning of the contacts of a function control relay, such as SMR, in accordance with the position of the polar contact of the relay IS, takes place, at another time, during the execution or message period of de-energization of the stepping circuit. This is necessary, in order that an impulse of one polarity for operating the function control relay on one step, may not improperly influence a function control relay on the preceding or following step, thereby producing false controls. For example, if it were not for this alternate operation of the relay IS and the function relay during distinct conditioning and execution periods, the shifting of the relay IS on an impulse of the other polarity might reverse the contacts of a function control relay on the next preceding step, if the polar contact of the relay IS should operate before the next stepping relay; or on the other hand, if the next stepping relay operated before the polar contact of the relay IS shifted, the function control relay of the next step might be momentarily operated improperly in accordance with the polarity of the preceding impulse. Such uncertain or improper operations are avoided by controlling the energization of the relay IS through the front contact of the relay LR, and the connection from the polar contact of the relay IS to the function control relays through a back contact 183 of said relay LR, so that the conditioning of the relay IS and operation of a function control relay in response to its condition take place at different times, accurately defined by the relay LR.

This same principle of employing a conditioning period and a message or execution period is carried out in other analogous operations of the system, including station selection for controls and indications, and for the transmission of indications, and for the transmission of indications over the message circuit.

Referring to Figs. 1A and 1B, the polarity on these control steps is determined by the energization or de-energization of the code sending relay CS, which in turn is dependent upon the energization or de-energization of the control buses 13, 14 and 15. These control buses are connected to contacts on the control levers SML and SGL for the station being called, through the front contacts on the code selecting relay CLS, which is energized by the code determining relay CD.

For example, referring to Fig. 1A, when the relay CD is energized to send out the code call of (+) (—) (+) for the station shown in Fig. 2, the control selecting relay CLS is energized, so that with the levers SML and SGL in the positions shown, the control bus 13 is energized, control bus 14 de-energized, and the control bus 15 energized, providing for the control of the function relays DR, SG and SMR at the station as shown in Fig. 2, in a manner which may represent switch normal, all signals at stop. The particular control of the switch and signals at the stations has not been illustrated and may be accomplished in any desired manner, there being a choice of two controlling conditions for each control step, which may be used individually, or in combination, to obtain the desired results.

*End of the operating cycle.*—After the last control step (sixth step as shown), the next impulse energizes the stepping relay $g$ in the control office, and the stepping relay 3 of the station being called. This drops the next preceding stepping relay $f$ in the control office, and the stepping relay 2 at the station, thereby ending the message period for the last control and indication step.

The energization of the stepping relay $g$ in the control office opens at its back contact 30 the stick circuit for the relay CC, which drops and breaks the energizing circuits for the impulsing relays $IR^1$ and $IR^2$, so that current is cut off from the stepping circuit for a long interval to mark the end of the operating cycle.

The de-energization of the stepping circuit for this long interval allows the slow-releasing relays SL at all of the stations to open their front contacts, thereby breaking the stick circuits for the stepping relay 3, and the transfer relay TR at the station being called, which in turn drops the station selecting relay SO at that station. Thus, the relays at the field stations energized and held up during the operating cycles are de-energized, and the equipments at all the field stations assume the normal condition shown in Figs. 2 and 3.

In the control office, when the stepping relay $g$ picks up, it breaks at its back contact 30 the stick circuit for the storage relay SR of the station just called; and the dropping of this relay SR in turn de-energizes its corresponding relays CD and CLS. As soon as this relay CD of the station called drops, if there should be any other storage relay SR energized, due to the actuation of the starting button SB for some other station, another relay CD will be energized, in a manner previously explained, thereby energizing or de-energizing the code buses 10, 11 and 12 to correspond with the code sending relay CS in accordance with the polarity of the first impulse required for the station next to be called.

After a time interval sufficient for the field station equipments to assume their normal condition, the relay $SL^0$ in the control office drops and closes its back contact 33 to complete a circuit for energizing the starting relay ST, in the event that another station is to be called at once.

Also, when the relay $SL^0$ in the control office drops, it breaks the stick circuit for the stepping relay $g$, which drops and closes a break in the stick circuit for the relay CC, so that this relay may be stuck up for another operating cycle. Also, the closing of the back contact 30 of the stepping relay $g$ applies potential to the wires 29, 28 and 27, to supply current to pick up the control selecting relay CLS, corresponding to the relay CD that may be energized. The picking up of this relay CLS changes the stick circuit for its corresponding storage relay SR from a back contact of that relay CLS to the bus 32, connected to (+) through the back contact 30 of the stepping relay $g$, so that at the end of the next operating cycle the storage relay SR in question will be de-energized.

Thus, at the end of an operating cycle for outgoing controls, there is a period of de-energization of the stepping circuit which causes the equipments at all of the field stations to assume their normal conditions ready for another operation; and in the control office the relays SR, CD and CLS for the station just called are de-energized, and the relays CD and CLS for the next station to be called, if any, are picked up, in turn causing energization of the starting relay ST. These various operations occur simultaneously or in rapid sequence so that after a brief interval, marking the end of an operating cycle, another operating cycle can start at once, if there are any new controls to be transmitted to any other stations. The order in which the stations will be called, if new controls have been set up for several stations, will be determined by the interlocked bank of relays SR and CD as shown in Fig. 7 and previously explained.

The end of an operating cycle, as just explained, is the same, when the system is automatically set into operation from the field, in the manner presently to be explained for the purpose of communicating new indications to the control office; and these operating cycles occur, one after another, so long as there are new controls to be transmitted out from the control office to some field station, or new indications are to be communicated from some field station to the control office.

*Indications.*—The selection of stations for outgoing controls and the transmission of these controls is all accomplished, as above explained, over the stepping circuit. The message circuit is utilized in accordance with this invention for the transmission or communication of indications to the control office from the various stations, one station at a time during each operating cycle.

Although, as one important characteristic feature of this invention, indications from any station may be communicated to the control office simultaneously and during the same operating cycle that controls may be transmitted from the control office to the same or any other station, it is convenient to explain the communication of indications alone on an operating cycle before considering how such simultaneous two-way transmission of controls and indications is accomplished.

Since there may be many trains on the portion of the railroad or territory under the supervision of the operator, and these trains may enter or leave the track circuits at two or more points in the territory at practically the same time, and since the switches and signals at the various stations in the territory are being operated from time to time by the operator, and two or more may assume an operated condition at substantially the same time, it will be evident that two or more field stations may have new indications to communicate to the control office at the same time. Indications can be received from only one station at a time, however, and it is necessary to make provision in a communication system of this type, so that the stations can communicate indications, only one station at a time, in some predetermined order or sequence. The way in which this is accomplished, in accordance with the present invention, is more conveniently explained after discussion of the operation of communicating indications to the control office, on the assumption that only one station has new indications to transmit.

The operation of communicating indications to the control office involves automatically starting the system into operation, registration in the control office of the station sending in the indications, and finally the transmission of these indications.

*Automatic starting.*—Whenever a change takes place in the occupied or unoccupied condition of a track circuit, or in the position or condition of the switch or signals at a station, which thus requires the communication of new indications, the system is automatically set into operation by momentarily energizing the change relay CH at the station.

Referring to Fig. 2, as illustrative of this momentary energization of the relay CH, the detector track relay T is shown as reversing the polarity of energization of the slow acting relay X, whenever this track relay picks up or drops, and a pick-up circuit for the relay CH, readily traced on the drawings, includes a back contact 214 of this relay X. Whenever the polarity of the energizing current for the relay X is reversed, it closes its back contact momentarily. A similar arrangement (not shown) would be applied to the switch machine, signals, or other devices to be indicated in the control office.

When the relay CH is thus momentarily energized, it is at once stuck up through a back contact 201 of the relay SI, in multiple with a back contact 170 of the counting relay 4, which corresponds to the first step after the last station selecting step. These stick circuits for the relay CH may be readily traced from (—), relay CH, wire 202, front contact 203 of relay CH, wire 204, then either over wire 205, back contact 201 of relay SI, to (+), or over wire 206, through back contact 170 of stepping relay 4, to (+).

Assuming the system at rest, when the change relay CH is energized, a circuit for energizing the lower winding of the pulsing relay P is established from (—), lower winding of relay P, wire 207, front contact 208 of relay CH, wire 209, back contact 210 of relay SL, wire 211, back contacts 153, 154 and 155 of the stepping relays 1, 2 and 3 respectively, wire 167, back contact 168 of relay TR, to (+).

This energization of the pulsing relay P interrupts the message circuit at its back contact 215, which message circuit is steadily energized from the battery BT³ (see Fig. 4). Thus, the message relay M⁰ in the control office is deenergized and closes its back contact 212 (see Fig. 1B), and energizes the starting relay ST over a circuit which may be traced from (+), back contact 33 of relay SL⁰, wire 34, relay ST, wires 35 and 213, back contact 212 of relay M⁰, to (—).

The energization of the starting relay ST initiates operation of the system in the same way as previously described, applying impulses to the stepping circuit of a polarity determined by the code sending relay CS.

The polarity of these stepping impulses makes no difference in the operation of the system in communicating indications from a field station to the control office; but it is convenient to consider at this time that no new controls are to be sent out, and that all of the code buses 10, 11 and 12, are de-energized, so that the relay CS remains de-energized on the successive steps and causes the stepping line to be energized with a series of negative impulses.

*Station registration for indications.*—Assuming such energization of the stepping circuit with a series of negative impulses, and considering the case where only one field station is ready to send in new indications, then the relay LR picks up on the first impulse, and before the relay SL picks up, the station selecting relay SI for incoming indications is energized at the station in question (which has its relay CH picked up) over a circuit which may be traced (see Fig. 6) from (+), back contact 220 of relay SL, wire 221, front contact 222 of relay LR, wire 223, front contact 224 of relay CH, wire 225, upper winding of relay SI, to (—).

As soon as the relay SI picks up, it is stuck up from (+), through the front contact 147 of the relay LR, wire 177, its own front contact 226, its upper winding, to (—).

The relay SI is also held up on succeeding steps in a manner more conveniently explained later in connection with the discussion of the way in which stations are registered or selected one at a time in the event that more than one station is ready to send in new indications; and for the present it may be assumed that this relay SI at the one station under consideration is held up until the end of the operating cycle.

When the relay SL picks up on the first impulse, it breaks at its back contact the starting circuit above traced for energizing the lower winding of the pulsing relay P.

This first impulse also picks up the stepping relay $a$ in the control office and the stepping relay 1 at each of the stations, in the manner previously explained. With the stepping relay 1 up at the calling station under consideration, if the jumper 150 for the first step is connected to the "(+) bus", as shown in Figs. 2 and 6, the upper winding of the pulsing relay P is energized at this station over a circuit which may be traced from (—), upper winding of relay P, wire 227, front contact 228 of relay SI, wire 229, back contact 230 of relay TR, wire 231, "(+) bus", jumper 150, wire 166, front contact 153 of stepping relay 1, back contacts 154 and 155 of stepping relays 2 and 3 respectively, wire 167, back contact 168 of relay TR, to (+).

When the pulsing relay P is thus energized, the message circuit is opened, and the message relay $M^0$ in the control office is de-energized.

If, on the other hand, the jumper 150 for the first step is connected to the "(—) bus", as shown in Fig. 3, the pulsing relay P is not energized through its upper winding, and as soon as the starting circuit through its lower winding is broken at the back contact 210 of the relay SL, the pulsing relay P drops, closing the message circuit at the station in question; and assuming for the present that only one station has new indications to communicate, the message line is closed at all other stations, and the message relay $M^0$ in the control office is energized.

Thus, on the first stepping impulse, the pulsing relay P is energized at the sending station, if the code call for that station is (+) on the first step, and is not energized if this code call starts with (—), on the first step.

These operations of picking up a station selecting relay SI at the calling station, holding up or dropping the pulsing relay P, and conditioning the message relay $M^0$ in the control office accordingly, all take place during the conditioning or operating period of this first impulse; and after sufficient time for these operations to occur, the stepping circuit is de-energized, dropping the relays LR at the several stations and in the control office. The dropping of the relay LR at the calling station produces no change in the relay SI, it being held up by the selecting stick circuit through its lower winding, hereinafter discussed.

The dropping of the relay $LR^0$ in the control office, closing its back contact 232, connects the upper winding of the first pilot relay $PT^1$ of the station registering bank to a back contact 233 of the message relay $M^0$, so that if this message relay is de-energized on this step, this first pilot relay $PT^1$ is energized over a circuit which may be traced from (+), back contact 233 of relay $M^0$, bus wire 234, upper winding of relay $PT^1$, wire 235, front contact 236 of stepping relay $a$, wire 237, back contact 232 of relay $LR^0$ to (—).

Thus, if the station calling has a code call beginning with a (+), corresponding to a de-energized message circuit, the first pilot relay $PT^1$ of the station registering bank is picked up during the message or execution period; but if the code call for the sending station starts with a (—) on the first step, this first pilot relay $PT^1$ is not energized.

Pilot relay $PT^1$, if energized, is stuck up from (—) through its lower winding, wire 240, its front contact 241, bus wire 242, wires 243 and 72, front contact 33 of the relay $SL^0$, to (+). This circuit holds up the pilot relay $PT^1$ until the end of the operating cycle.

On the second impulse, the second stepping relays $b$ and 2 are picked up, and the first stepping relays $a$ and 1 are dropped, in a manner previously explained, and during the operating or conditioning period, the pulsing relay P at that calling station is energized or de-energized on this second step, depending upon the position of the jumper 151 for the second step, thereby opening or closing the message circuit on this second step to pick up or drop the message relay $M^0$ in the control office. Such change in this relay $M^0$ has no effect on the first pilot relay $PT^1$, or on the second pilot relay $PT^2$, at this time, since the energizing circuits for these pilot relays are broken at the back contact 232 of the relay $LR^0$.

During the execution period, following the second impulse, the second pilot relay $PT^2$ of the station registering bank is energized or not, depending upon the condition of the message circuit and the position of the contact 233 of the relay $M^0$.

A similar operation takes place on the third station selecting step, and all subsequent station selecting steps, until sufficient steps have been taken to compete the code call. In other words, a station sending indications into the control office identifies itself by a code call, consisting in energizing or de-energizing the pulsing relay P, to open or leave closed the message circuit on each step, an interruption of the message circuit corresponding to the positive impulse and an energized message circuit corresponding to a negative impulse, from the standpoint of the different code combinations, such as shown in the code table of Fig. 8. The arrangement shown provides three station selecting steps, sufficient to select eight different stations.

On the next step after the last station selecting step, which is the fourth step in the arrangement shown, one of the station registering relays $C^1$, $C^2$, etc. is energized, depending upon the positions of the contacts of the pilot relays $PT^1$, $PT^2$ and $PT^3$, which were respectively energized or allowed to remain de-energized on a corresponding one of the previous station selecting steps.

Assuming a code call of (+) (—) (+), represented by the station shown in Fig. 2, the pilot relays $PT^1$ and $PT^3$ would be energized and the pilot relay $PT^2$ de-energized; and on the fourth step a circuit would be established to energize the upper winding of the station registering relay $C^3$, from (—), front contact 245 of stepping relay $d$, wire 246, front contact 247 of relay $PT^1$, wire 248, back contact 249 of relay $PT^2$, wire 250, front contact 251 of relay $PT^3$, wire 252, upper winding of relay $C^3$, to (—). This relay $C^3$ when energized is stuck up from (—), lower winding of relay $C^3$, wire 253, its front contact 254, wire 255, to the bus wire 256, wires 243 and 72, front contact 33 of the relay $SL^0$, to (+). This relay $C^3$ remains energized until the end of the operating cycle. Each of the other station registering relays $C^1$ and $C^2$, etc., if energized is stuck up in the same way.

The operation of registering in the control office the particular station having new indications to communicate is thus completed, and a station registering relay, such as $C^3$, for the station calling is energized in the control office.

*Transmission of indications.*—On the fourth step, the relay TR is picked up at the station calling by a circuit through its upper winding, which may be traced from (+), through the front contact 170 of stepping relay 4, wires 171 and 264, front contact 265 of station selecting relay SI, wire 174, upper winding of relay TR, to (—).

The relay TR is not picked up at any of the other stations, because the relay SI is not up at any of these stations, not having been picked up on the first impulse due to the fact that no new indications are assumed to be ready at any of these other stations, so that the relay CH at these other stations was not energized at the time of the first impulse. It is noted in this connection that the relay SI at a station can pick up only on the first impulse through the back contact 220 of the relay SL, so that energization of the change relay CH at any station during an operating cycle has no effect upon its station selecting relay SI.

When the transfer relay TR picks up at a station which also has its station selecting relay SI up, the upper winding of the pulsing relay P is connected to the contacts 260, 261, 262 and 263 of the stepping relays 1, 2, 3 and 4, so that this relay P may be energized or de-energized, upon the succeeding steps, in accordance with the position of the contacts controlled by the devices to be indicated.

For example, on the first indicating or control step (fourth step as shown), following the last station selecting step, the upper winding of the pulsing relay P is connected to the contact of the detector track relay T over a circuit from (—), upper winding of relay P, wire 227, front contact 228 of relay SI, wire 229, front contact 230 of relay TR, wire 266, front contact 263 of stepping relay 4, wire 267, to contact 200 of relay T.

If the detector track circuit is occupied, and the track relay T is down, this being one condition to indicate in the control office, the pulsing relay P is energized to de-energize the message circuit and drop the relay $M^0$ in the control office, but if this track circuit is not occupied and the track relay T is picked up, the pulsing relay P is not energized on this step, and the message relay $M^0$ in the control office remains energized. This picking up or dropping of the message relay $M^0$ in the control office, depending upon the condition of the track relay T, occurs during the conditioning or operating period.

During the message period, the OS indication relay IN (see Fig. 1A) is connected over wire 268, through the front contact 269 of its station registering relay $C^3$ to the first indication bus 16, through the front contact 270 of the fourth stepping relay $d$, wire 271, back contact 272 of relay $LR^0$, wire 273, to the contact 274 of the message relay $M^0$. If the message relay $M^0$ is energized (corresponding to an unoccupied detector track circuit), the OS indication relay IN is energized positively, and its polar contact assumes the right-hand position shown. On the other hand, if the message relay $M^0$ is de-energized, corresponding to an occupied detector track circuit, the OS indication relay IN is energized with negative polarity, shifting its polar contact to the left to light the indication lamp I over a circuit readily traced on the drawings. Thus, on the fourth or first indicating step, the occupied or unoccupied condition of the detector track circuit is indicated in the control office.

Either of two conditions may be similarly indicated in the control office on succeeding indication steps, dependent upon the open or closed condition of the indication contacts, such as 288 and 289, which are connected to the pulsing relay P through the front contacts 260 and 261 of the stepping relays 1 and 2 respectively. On each of these succeeding steps, a two-position polar indication relay, such as relays $IN^1$ and $IN^2$, is connected through a front contact of the corresponding station registering relay $C^3$ to the indication buses 17 and 18 which in turn, are connected through the front contacts of the stepping relays $e$, and $f$ to the contact 274 of the message relay $M^0$, so that on each of these indicating steps, one of these indication relays may be energized positively or negatively, during the message period, dependent upon the position of the contact of the message relay $M^0$, responding to the opening or closing of the message circuit by the energization or de-energization of the pulsing relay P, all in a manner which will be readily understood without further detail explanation.

It should perhaps be stated that, as previously explained, when the transfer relay TR picks up at a station, the bank of stepping relays 1 to 3 repeat, while the stepping operation at the other stations stops with the fourth stepping relay.

The operation of the stepping relay 3 on the last step of the operating cycle during the repeat operation at the selected station, is preferably an idle step, in the sense that this relay 3 does not have any indication contacts, such as the contacts 200, 288 and 289, connected to its front contact 262. When the stepping relay 3 picks up, the stepping relay 2 drops; and since there are no indication contacts for the stepping relay 3, the pulsing relay P is disconnected from all indication contacts and the message circuit may assume its normal energized condition. This prevents an open message circuit on the last indication step, which would de-energize the message relay $M^0$ in the control office, producing an improper energization of the starting relay ST at the end of the operating cycle.

In the same way, the operation of the stepping relay $g$ in the control office is an idle step. Energization of this relay $g$ on this idle step drops the relay $f$ of the next preceding step, and cuts off the connection between the indication bus 18 and the contact 274 of the message relay $M^0$, so that de-energization of this message relay $M^0$ by a subsequent closing of a starting circuit at a field station may not cause an improper operation of the indication relay connected to the indication bus 18.

This idle step just explained is preferably employed to define the end of a message period on the last indicating step, and to avoid possible interference between the indication operations occurring on the last step and the operations occurring in automatically starting the system from the field; but by properly timing the operations of the relays involved, or by other expedients, this idle step may be eliminated.

Having explained how the system of this invention operates to register in the control office a particular field station having new indications to transmit, and how these indications are transmitted to the control office, consideration may now be given to the way in which the system operates to select between a plurality of stations which may be ready at the same time to send in new indications.

*Selection between a plurality of stations ready to transmit new indications*

As previously stated, it may happen that two or more stations may have new indications to communicate to the control office at the same time, as for example, when two trains enter or leave track circuits simultaneously; and in a communication system of this type, suitable for centralized traffic control, it is necessary to make provision to avoid interference between such two or more stations that may be ready to send in new indications.

Generally speaking, in accordance with this invention, only one station registers itself in the control office and transmits its indications, during an operating cycle, regardless of the number of stations which may have new indications to transmit. The sequence or order, in which the stations communicate their indications, one station at a time, is fixed by the characteristics of the code calls of these stations.

The principles of this scheme or method of station selection for incoming indications will be made apparent by considering how the station shown in Fig. 2, with a code call of (+) (—) (+), registers itself in the control office on an operating cycle, and drops out or cancels the station shown in Fig. 3 having a code call of (—) (+) (—). Assuming that both of these stations have new indications to transmit, the change relay CH at each of these stations is energized; and when the system comes to rest after an operating cycle, the pulsing relay P is picked up at each of these stations on a first impulse to start the system into operation, in the same way previously explained. Also, the station selecting relay SI at each of these stations is energized on the first impulse.

At the station of Fig. 2, the jumper 150 for the first step is connected to the "(+) bus", the code call for this station beginning with (+); and when the stepping relay 1 picks up on the first impulse, the pulsing relay P is energized and breaks the message circuit. This opening of the message circuit at the station of Fig. 2 drops the message relay M¹ at the station of Fig. 3, the message relay M at the station of Fig. 2, the relay M⁰ in the control office, and at all other stations, all of these message relays being in series (see Fig. 4).

At the station of Fig. 2, such dropping of the relay M at that station, during the conditioning period of the first impulse, completes a selecting stick circuit through the lower winding of the relay SI, which may be traced from (—), lower winding of relay SI, wire 280, front contact 281 of relay SI, wire 282, back contact 283 of relay M, "(+) bus", jumper 150, wire 166, front contact 153 of stepping relay 1, back contacts 154 and 155 of the stepping relays 2 and 3, wire 167, back contact 168 of relay TR, to (+).

In the case of the station of Fig. 3, however, such a selecting stick circuit for the relay SI¹ is not established, since the jumper 150¹ at this station is connected to the "(—) bus", whereas the relay M¹ is de-energized and connects the stick circuit of the relay SI¹ to the "(+) bus".

Consequently, when the relays LR and LR¹ drop at these two stations, in the message period following the first impulse, and break the stick circuits through the upper windings of the relays SI, the relay SI at the station of Fig. 2 is held up, through its selecting stick circuit, while the other relay SI¹ at the station of Fig. 3 drops.

On the second impulse, when the stepping relay 2 picks up and the stepping relay 1 drops at both of these stations under consideration, the pulsing relay P at the station of Fig. 2 is not energized, since the jumper for the second step at this station is connected to the "(—) bus"; nor is the pulsing relay P¹ energized at the station of Fig. 3, even though the jumper 151¹ for the second step at this station is connected to the "(+) bus", because the relay SI¹ at this station is now de-energized and opens at its front contact 228¹ the circuit for energizing the upper winding of the relay P¹. Consequently, the message circuit is closed at both of these stations during the conditioning period of this second impulse; and under these conditions, the relay SI at the station of Fig. 2 is held up by a selecting stick circuit through the front contact 283 of the relay M, the "(—) bus", and the jumper 151.

On the third step, the jumper 152 at the station of Fig. 2 being connected to the "(+) bus", the message circuit is again opened, but the relay SI is still held up by a stick circuit through the back contact 283 of the relay M, jumper 152 and front contact 155 of the stepping relay 3.

During these three station selecting steps, the relay M⁰ in the control office is respectively de-energized, energized and de-energized, corresponding to the code call of (+) (—) (+) for the station of Fig. 2; and the pilot relays PT¹, PT² and PT³ are operated in the manner previously explained to register this station in the control office.

In this connection it will be noted, that an open or de-energized message circuit on a given step corresponds to a (+) impulse, from the standpoint of the code call belonging to the station, and a closed message circuit corresponds to a (—) impulse. In other words, for a (+) impulse in a code, as shown in the code table of Fig. 8, the jumper for that step is connected to the "(+) bus", and the pulsing relay P is energized on that step to open the message circuit. This, of course, is merely an arbitrarily assumed relation; and if desired, the relay P may be connected to the "(—) bus", making an open message circuit correspond with a (—) impulse of the code call for that station, rather than the opposite.

In the case assumed, on the first step the station of Fig. 2, having a code call starting with a (+), drops out, the relay SI¹ of the station of Fig. 3 having a code call starting with (—); and after this first step, the station of Fig. 2 registers itself in the control office in the usual way, by opening or closing the message circuit on the succeeding steps. Putting it another way, after the station of Fig. 3 was dropped out on the first step, the system operated to register in the control office the station of Fig. 2 in the same way as if that station had been the only one ready to send in indications at the beginning of the operating cycle.

On the next step after the last station selecting step (fourth step in the arrangement shown), the transfer relay TR at the surviving station of Fig. 2 picks up, and the indications from that station are transmitted to the control office in the same way above explained.

In the example just assumed, only two stations were considered as being ready to send in new indications, and one of these stations was dropped out on the first step. The same plan of operation occurs, irrespective of the number of stations that may be ready at the same time to send in indications, and such stations are dropped out, one or more at a time, on each step, until only one station is left with its relay SI energized when the full number of station selecting steps has been taken.

Referring to the code table of Fig. 8, and assuming that two stations with code calls 4 and 5 are both ready to send in indications at the same time, it can be readily seen how the station with the code call 5 is dropped out on the first step in the same way as explained above with regard to the stations of Figs. 2 and 3, having the code calls 3 and 6. In the case of the code calls 2 and 3, the station with the code call 3 will drop out on the second step; and in the case of code calls 1 and 2, the station with the code call 2 will drop out on the third step.

This scheme of station selection for incoming indications, which is an important feature of this invention, may be said to involve station selection on the basis of superiority of code calls. From the examples above given, it can be seen that a station having a code call with a (+) on the first step will drop out all other stations having a code call with a (−) on the first step, by reason of the fact that the first of these stations opens the message circuit on this step and positions the contact of the message relay M at the other stations out of correspondence with the jumper 150 for the first step, so that the relays SI at these other stations have no selecting stick circuit and drop on the next message period. In other words, a code call with a (+) on any step is superior to the code call with a (−) on that step.

The station registered in the control office, if several are ready to send in new indications, and the station which drops out all of the other stations, is the one which has the most superior code call, that is, the station which causes the message circuit to be opened on the earliest step, or the greatest number of steps. The code table of Fig. 8 illustrates eight code calls arranged in the order of their superiority, and in the order in which the stations having these code calls would transmit to the control office new indications, if it should happen that all of these stations were ready to transmit indications at the same time.

Even if there are several stations with new indications to transmit at the same time, the station with the superior code call is correctly registered in the control office, the same as if it were the only station ready to send in indications. This will be readily appreciated, when it is noted that the relays SI at several stations ready to send in indications, remain energized and render that station effective to control the message circuit on the several steps, only so long as their code calls are identical. For example, referring to the code table of Fig. 8, the relays SI would remain energized at the stations having code calls 1 and 2, for both the first and second steps, both stations interrupting the message circuit on each of these steps, this being the proper station registration for both of these stations as far as the first two steps are concerned. On the third step, however, the relay SI at the station having the code call 1 remains energized, and on this step the message circuit is broken, in accordance with the code call for this station, thereby de-energizing the relay $M^0$ in the control office to register correctly the surviving station. In this case assumed, the pilot relays $PT^1$, $PT^2$ and $PT^3$ of the station registering bank in the control office are all picked up on the three steps; and this is the correct registration for the station having the superior code call 1, which is also the only station having its relay SI energized, and capable of controlling the message circuit on the subsequent steps in accordance with the positions of its indication contacts, such as 296, 288 and 299.

A station with an inferior code call of (−) on the first step may have a superior code call of (+) on a succeeding step, but due to the control of the pulsing relay P by the station selecting relay SI, such a station would drop out on the first step, and could not thereafter control the message circuit so as to cause a mutilation or interference in the code call received in the control office. For example, referring to the code calls 4 and 5 of Fig. 8, if it were not for this control of the pulsing relay P by the relay SI, the opening of the message circuit on the first step for the code call 4, followed by the opening of the message circuit on the second and third steps for the code call 5, would produce in the control office a false or improper code call, corresponding to code call 1. The station with code call 5, however, in accordance with this invention, drops out on the first step, and hence cannot control the message circuit on the second and third steps, so that the registration in the control office is that of code call 4, the more superior of these two code calls 4 and 5.

Assuming several stations ready to transmit in new indications on the first operating cycle, the station with the most superior code is registered in the control office, as just explained; and the relay CH at this station is de-energized on the next step (fourth step as shown) after the last station selecting step, its stick circuit through the back contact of the relay SI being broken, since this relay is still energized, and its other stick circuit through the back contact of the stepping relay 4 being broken when this relay is picked up on the fourth impulse. At all of the other stations, which were ready to send in new indications, but which dropped out on some one of the station selecting steps, the relay SI is down on the fourth step, and the relay CH is held up through the back contact 201 of this relay SI.

At the beginning of the next operating cycle, the relays SI at all of the stations still having a relay CH energized, are picked up on the first impulse; and during the following operating cycle, the station with the most superior code of those remaining is registered in the control office, transmits its indications, and then is eliminated by the dropping of its relay CH. This same operation continues, until all of the stations have transmitted their indications to the control office, the system being automatically set into operation at the end of each operating cycle, as previously explained, so long as there is a change relay CH energized at any one of the stations.

From the foregoing it can be understood how the communication system of this invention provides for the proper transmission of indications from the several field stations, one at a time, without interference, in a sequence or order depending upon the superiority of the code calls assigned to the stations. These code calls may be assigned to the stations in any way desired, irrespective of the geographic location of the stations; and this order of preference in transmitting indications may be the same as that for outgoing controls, or may be made different, as may be found desirable or expedient. For example, by connecting the starting button SB for the first station nearest the control office to the first storage relay SR, in the bank of interlocked code determining relays of Fig. 7, this first station may be made the one to respond first for outgoing controls in the event that several starting buttons are operated at about the same time; but, if desired, this same first station may be made the last to send in its indications, if several stations have new indications to transmit at the same time, by assigning to this first station the most inferior code call, the jumpers for the contacts of the first relay CD energizing the code buses 10, 11 and 12 being positioned to fit the code call thus assigned to this station.

For these reasons, the system of this invention may be readily adapted to the varying conditions encountered in practice, so that the sequence for outgoing controls and receiving of indications may be selected as desired, either when the system is originally installed, or some time later, so as to bring about the transmission of stored controls and reception of stored indications in a sequence or order of priority best adapted for the operating conditions encountered in the particular territory under supervisory control.

Since a change in the indications, particularly indications of track circuit occupancy may take place at any time, and the system operates to transmit indications from a field station only when the change relay CH is energized at that station, it is necessary to control this relay CH in such a way that a cycle of operation for its station will always occur, subsequent to each change in indications irrespective of when this change may take place. Referring to Fig. 2, after a station has registered itself in the control office on the station selecting steps, on the next (fourth step as shown) or first indication step, the relay CH is de-energized; and as soon as this fourth relay drops on the fifth impulse, the circuit for sticking up the relay CH is prepared. Consequently, any subsequent change in indications, such as the dropping or picking up of the track relay T, will cause another energization of the relay CH, and another operating cycle for this station. This change in the indication controlling contacts of a track relay or the like, requiring another operating cycle to transmit the new or changed indication, may take place even while the operation of transmitting indications from the corresponding station is going on, and even after the particular step for the changed indication has been taken during this operation; and in order that the relay CH may remain energized to cause another operating cycle for this same station, the stepping operation is arranged to stop upon the energization of the stepping relay 3, when the stepping relays repeat at a selected station. This is accomplished by employing the proper number of stepping relays in the control office.

Also, in order to avoid skipping or losing the indication of the occupancy of the detector track circuit, which is relatively short and may be occupied by a short train travelling at high speed for only a few seconds, special relays and circuits (not shown) are preferably provided, such as shown for example, in the prior application of N. D. Preston, Ser. No. 352,558, filed April 4, 1929, for storing up the condition of occupancy of this detector track circuit, until the system has operated to transmit the indication of this condition, and also for storing up in the control office such transmitted indication of the occupancy of this track circuit, until recognized by the operator. In this connection it should be understood that all of the devices, such as the switch machine and signals, which are to be indicated in the control office, are provided with means similar to the relay X for momentarily energizing the relay CH upon any change in the position or condition of these devices; but with the exception of the indication of the occupancy of the detector track circuit, it is usually not necessary to provide for storing these indications.

*Two-way transmission.*—In the foregoing discussion it has been explained how, in response to the operation of a starting button, controls may be transmitted to a selected station during an operating cycle, and it has also been explained how, during an operating cycle, any station having new indications to transmit, may register itself in the control office and operate the indication relays in the control office relating to that station. From this explanation, it will be observed that the transmission of controls to a selected station takes place over the stepping circuit, and the transmission of indications over the message circuit, the transmission of indications being independent of the polarity of the stepping impulses.

Consequently, the system of this invention has the very important and desirable feature, that at the same time and during the same operating cycle, controls may be transmitted to any selected station, and indications may be received in the control office from that station, or any other station.

As illustrative of this operation of simultaneous two-way transmission of controls and indications, assume that new controls are to be transmitted to the station of Fig. 2, and new indications are to be received from the station of Fig. 3. This condition may arise in various ways. For instance, the detector track circuit of Fig. 3 may become occupied at the same time the operator actuates the starting button for the station of Fig. 2. Usually, however, simultaneous transmission of controls and indications occurs when controls or indications for a plurality of stations are stored up in the control office or in the field, so that at the beginning of an operating cycle, some one or more stations are ready to send in new indications at the same time controls are to be transmitted to other stations.

In the case under consideration, the system is set into operation the same way as previously described. The starting relay ST is energized both through the back contact 212 of the relay M⁰ and a front contact of a relay CD; but obviously the effect upon the relay ST is the same.

The first three impulses applied to the stepping circuit are of a polarity to form the code call for the station of Fig. 2, the relay SO at that station remaining energized, while the relays SO at all of the other stations are de-energized. Also, during these three station selecting steps, the message circuit is opened or closed on these steps at the station of Fig. 3, in accordance with the code call of that station, dropping out the relays SI of other stations (if any) with an inferior code call, and registering this station in the control office.

On the next or fourth step, the relay TR is energized at the station of Fig. 2 through the front contact 172 of the relay SO; and similarly, the relay TR¹ at the station of Fig. 3 is energized through the front contact 265¹ of the relay SI¹. At the station of Fig. 2, with the relays SO and TR energized, the contacts of the stepping relays connected to the function control relays DR, SG and SMR are connected to the polar contact of the impulse storing relay IS, so that these function control relays may properly respond to the polarity of the succeeding impulses, according to the position of the control levers SML and SGL for this station. At this same station of Fig. 2, however, although the transfer relay TR is energized, the contacts of the stepping relays connected to the indication contacts 200, 288 and 289 are not connected to the pulsing relay P, since the relay SI at this station is de-energized. This station of Fig. 2, therefore, cannot control the message circuit.

The opposite condition exists at the station of Fig. 3. The indication contacts 200¹ and 288¹ are connected to the pulsing relay P¹ through the front contact 230¹ of the transfer relay TR¹, front contact 228¹ of the relay SI¹, while the function control relays at this station are not connected to the polar contact of the relay IS¹, since the relay SO¹ is de-energized and its front contact 185¹ is open.

Under these conditions, as impulses of the proper polarity are applied to the stepping circuit to transmit the desired controls to the station of Fig. 2, the indication contacts of the station of Fig. 3 open or close the message circuit on the several steps to transmit to the control office the indications for that station. The function control relays DR, etc. at the station of Fig. 3 do not respond, because the relay SO at that station is de-energized. Likewise, although the indication contacts at the station of Fig. 3 can control the message circuit, the relay SI¹ being energized at that station, the similar indication contacts at the station of Fig. 2 cannot control the message circuit, since the relay SI at that station is de-energized.

In the case assumed, controls were transmitted to one station on the same operating cycle that indications were received from another station. It will be evident, however, that the same station may, on a given operating cycle, transmit new indications and receive new controls. This might happen if the operator should happen to actuate the starting button SB for a station at the same instant the change relay for that station is energized.

This same operation of duplex or simultaneous two-way transmission of controls and indications will occur on an operating cycle, regardless of the number of stations which may have new indications to transmit, and irrespective of the number of controls that may be stored up in the control office. In such a case, the station called on the next operating cycle would be determined by the relay CD next in order, and the station calling would be the one having the most superior code call of those ready to transmit new indications.

This order or sequence of priority is that existing at the beginning of the operating cycle and cannot change during an operating cycle. For example, if the relay CD¹ of the interlocked bank of code determining relays shown in Fig. 7 is picked up at the beginning of an operating cycle, subsequent energization of the storage relay SR cannot pick up the relay CD, even though this relay CD will ordinarily have preference over the relay CD¹, since the wire supplying pick-up current for the bank of relays CD is disconnected from (+) at the back contact 125 of the relay CC, during a cycle of operation. Similarly, even though a change relay CH should pick up at a station with a superior code call, during an operating cycle, the relay SI at that superior station would not be energized, its pick-up circuit being open at the back contact 220 of the relay SL. These arrangements are necessary, in order that no change in the starting buttons or indications occurring during an operating cycle, may interfere with the operations on that cycle, and cause either a false or mutilated code call, or wrong station registration, or improper controls or indications.

These operating characteristics of the system of this invention permit the operator to send out controls to any station he wishes, while indications of track circuit occupancy, position of the switches and signals, or the like, are being received from some other station. The operator is able to position his control levers, such as SGL and SML, and operate the starting buttons for the several stations, at any time and in any way he finds necessary to handle train movements, without paying any attention to what change in track circuit occupancy or the like may have occurred to necessitate the transmission of new indications. In other words, the use of the system by the operator in sending out new controls does not hold back or lock out the receiving of indications, nor does the operation of sending in new indications to the control office prevent the operator using the system for transmitting out new controls.

Bearing in mind that, with the communication system applied to a busy railroad, the need for transmission of new indications exists very frequently, from time to time as the switches or signals assume their different positions, and as trains enter and leave the switch track circuits, it can be readily recognized that this feature of duplex or two-way transmission of controls and indications adds greatly to the capacity of the system and the speed and facility with which train movements can be governed. A new group of indications can be received from any station during each operating cycle, which in practice takes place in some two seconds, so that indications may be received from the several field stations, approximately every two seconds, whether the system is being used to transmit controls or not. Similarly, on the other hand, a complete set of controls may be transmitted to any selected station in an operating cycle of about two seconds, whether indications are being received or not. In short, the system can be extended to include as many stations as desired, without delaying the transmission of either controls or indications, up to the limit where the rate at which controls or indications to and from the stations will exceed for a considerable time one station every two seconds.

*Phantom station.*—In the foregoing discussion, assuming three station selecting steps, with a choice of a positive or a negative impulse on each step, a selection of eight different stations has been assumed. As a matter of fact, in order to avoid certain complications in the control office, and to make the field station equipments uniform, the most inferior code call comprising all negative impulses, (the eighth code call in the code table of Fig. 8), is preferably not assigned to any station in service, and in a sense is a code call for a non-existent or "phantom" station.

As above explained, during an operating cycle, controls may be transmitted to a station when no new indications are ready to be received, or indications may be received from some station when no new controls are ready to be transmitted, or new controls and new indications may be transmitted simultaneously.

When indications only are to be received on an operating cycle, the stepping circuit is energized with a series of negative impulses, this being easily and conveniently obtained by de-energizing all of the code buses 10, 11 and 12, so that the code sending relay CS is de-energized on all steps. This is the most inferior code call. If this series of negative impulses were assigned as a code call to one of the stations in service, that station would be selected on such an operating cycle for bringing in new indications only; and the proper controls would have to be repeated to that station by respectively energizing or de-energizing the control buses 13, 14 and 15, in accordance with the existing positions of the control levers for that station. This would require some special control of the connections between the control levers of that station and the control buses, different from the other stations, so as to have these connections established when no new controls are to be transmitted to any other station, and broken if such new controls are to be transmitted to some other station.

On the other hand, when controls alone are to be transmitted on an operating cycle, the same conditions for a station registration exist as if new indications were to be received; and if the most inferior code call of a series of negative impulses were assigned to a station, which corresponds to an energized message circuit on each station selecting step, the registration of that station would occur in the control office, and the indications would have to be repeated from that station to avoid false or improper indications. This would require special connections at this station with the most inferior code call to permit its station selecting relay SI to be energized, irrespective of the condition of its change relay CH, by providing a shunt for the contact 224 of its relay CH.

For these reasons, the most inferior code call is preferably used for a "phantom" station, reducing by one the total number of stations which may be selected on a given number of station selecting steps, namely, seven stations for three station selecting steps, fifteen stations for four steps, and so on. This avoids making special electrical connections in the control office, and leaves the most inferior code call available for operating the stepping relays in the control office and at the field stations, for transmission of indications only, without selecting any station in so doing, and without requiring the repetition of the existing controls to that station. Similarly, when this most inferior code call is not used for a regular station but belongs to a "phantom" station, there is no station registering relay energized through back contacts of the pilot relay $PT^1$, $PT^2$ and $PT^3$, and no special provision has to be made at a station to repeat its indications on each operating cycle of control transmission only, that is, when there is no other station, with a superior code call, ready to send in indications.

*Repeat operations.*—The operator may repeat the transmission of controls to any selected station by actuating the starting button for that station. By holding down a starting button SB, so that the corresponding relay SR cannot drop at the end of the cycle of operation, the operator may send out the same or different controls to the same station for several operating cycles, even though several other storage relays SR may be at that time energized.

The operator may sometimes desire a repeat or check of the indications from some station. To do this, he changes one of the control levers, as SML or SGL, for that station, and operates the starting button SB, so as to transmit controls which will cause some change in the condition or position of the switch or signals at that station, thereby causing energization of the relay CH. This station will then send in its new indications; and by positioning the control levers and operating the starting button, the operator may send out controls to restore the switch or signals to the former or any other desired position, whereupon the relay CH will be picked up again, and a complete set of indications will again be received from this station.

*General summary.*—From the foregoing explanation of the various individual steps in the operation of the system of this invention, the characteristic features, mode of operation, and advantages of the system as a whole can be readily appreciated; and a brief and general statement will suffice, it is believed, to make clear the nature of the invention, both broadly and specifically.

Three line wires form a stepping circuit and a message circuit, extending from the control office to all of the stations. A bank of stepping relays in the control office and at each way station operate sequentially, one at a time, in synchronism, in response to impulses applied to the stepping circuit, irrespective of the polarity of these impulses.

The system is set into operation when the operator actuates a starting button in the control office, or when a change relay CH is energized at any field station as a result of a change in the position or condition of the devices at that station to be indicated.

The operating cycle of the system is made up of station selecting steps and control or indication steps. During the station selecting part of the cycle, the polarity of the successive impulses applied to the stepping circuit corresponds with the combination of impulses, or code call, either belonging to the station being called by the operator, or belonging to a phantom station if no new controls are ready to be transmitted on this operating cycle.

During the station selecting impulses, the station selecting relays SO at the several stations (which are all energized on the first impulse) are automatically de-energized in groups during the execution period after each impulse, until there remains only one relay SO energized at the particular station being called. At the same time, during these station selecting impulses, any station having new indications to communicate to the control office registers itself in the control office by opening or closing the message circuit on each of these steps. If more than one field station is ready at the beginning of an operating cycle to transmit indications, the station selecting relays SI at these stations, all energized on the first impulse, are automatically de-energized in groups or one at a time, during the message period after each impulse, in accordance with the relative superiority of the code calls of these stations, until only one relay SI remains energized at the station having the superior code call, this particular station being the one registered in the control office.

After the necessary number of stepping impulses required to select one station out of the total number, in accordance with a code of the Baudot or sub-division type, either of two controlling conditions is produced in the selected station on each one of the following control steps, depending upon the polarity of the stepping impulse causing these steps; and at the same time either of two positions or conditions of a switch signal, or other device at a selected field station, is indicated in the control office on each of the indicating steps, by opening or closing the message circuit on each of these steps.

The transmission of controls from the control office to a selected station may take place alone during an operating cycle, or the transmission of indications from the field station to the control office alone, or controls may be transmitted to a station on the same operating cycle that indications are being received from the same, or some other station.

Such an operating cycle occurs whenever the system, while at rest, is set into operation from the control office or from a field station; and the operating cycles follow one another, with an intervening period of de-energization of the stepping circuit, so long as there are new controls stored up in the control office, or new indications stored up in the field stations. The order or sequence in which controls are transmitted to the stations, when such controls for a plurality of stations are ready at the same time, is determined by the way in which the starting buttons for these stations are connected to the bank of interlocked relays SR and CD, shown in Fig. 7; and this order is independent of the geographic locations of the station. The order or sequence in which a plurality of stations, all ready at the same time to transmit new indications, act to transmit their indications, one station at a time, is determined by the relative superiority of the code calls assigned to these stations, and this order is independent of the geographic locations of the stations.

Relays are employed for all operations. The equipments for the field stations are the same, except for certain jumper connections determining the code call of the station, so that these field equipments may be easily and quickly replaced as a unit in case of trouble.

The system may be extended to any desired number of stations, by providing for the necessary number of station selecting steps. The duplex or simultaneous two-way transmission of controls and indications permits the system to be used with a relatively large number of stations, since the transmission of indications is not delayed by the transmission of controls and vice versa. If the system has been installed for a given territory, it may be readily extended for a greater territory, without changing the apparatus already installed, merely by adding additional field station equipments. Such extension does not materially change the time of an operating cycle, each additional station selecting step doubling the possible number of stations. An additional station may also be readily installed at any intermediate point in the equipped territory, without changing the apparatus of the other stations, or the operating time of the system.

Each field station equipment is preferably provided with a number of stepping relays, sufficient to provide enough station selecting steps for a typical number of stations, and enough control and indications steps for a typical layout of a single switch, or crossover, with its associated signals and detector and approach track circuits. A bank of eight stepping relays, providing for 128 stations and seven control and indication steps, is ordinarily suitable for this purpose; and with such an organization, the time interval for an operating cycle is in the order of two seconds.

Various other characteristic features and advantages of the invention will be apparent. The specific organization of relays and circuits shown and described is merely one illustrative specific embodiment of the invention; and it should be understood that various modifications, adaptations and additions may be made in the specific embodiment, without departing from the spirit or scope of the invention, the appended claims being intended to define the novel features and limitations in the scope of the invention, rather than the foregoing description.

What we claim is:—

1. In a centralized traffic controlling system for railroads, a control office, a plurality of field stations, a stepping circuit, step-by-step means at the control office and at each field station all operated in synchronism by impulses on said stepping circuit regardless of their polarity, and station selecting means at said stations selectively responsive to different combinations of positive and negative impulses applied to said stepping circuit.

2. In a centralized traffic controlling system for railroads, a control office, a plurality of field stations, a stepping circuit extending from the control office through the several stations, means in the control office manually controllable by the operator for applying to said stepping circuit any one of several different series of current impulses, step-by-step means in the control office and at each station operated synchronously by said impulses of any series, and means at each station energized at the beginning of each series of impulses and maintained energized only if said series of impulses corresponds to a distinctive code call belonging to that station.

3. In a centralized traffic controlling system for railroads, a control office, a plurality of field stations, step-by-step means in the control office and at each station operated synchronously, a circuit extending from the control office through the several stations, means in the control office for governing the energization of said circuit on each step, and means at each station energized at the beginning of the operation of said step-by-step means and maintained energized only if the condition of said circuit on each of the successive steps corresponds with a distinctive code call belonging to that station.

4. In a centralized traffic controlling system for railroads, a control office, a plurality of field stations, a stepping circuit extending from the control office through the several stations, step-by-step means at the control office and at each station operated in synchronism by impulses on said stepping circuit regardless of their polarity, station selecting relays one at each station all energized by the first impulse applied to the stepping circuit, and means at each station responsive to the polarity of a predetermined number of successive stepping impulses for de-energizing its selecting relay if such polarity on any step fails to match the particular code combination of impulses constituting a code call for that station, whereby said selecting relays are deenergized in groups on each impulse, and one of these stations being thereby selected by its particular combination of positive and negative impulses by having its station selecting relay energized after said predetermined number of impulses.

5. In a centralized traffic controlling system for railroads, a control office, a plurality of field stations, a stepping circuit extending from the control office through the several stations, traffic controlling devices at each station, means in the control office manually controllable by the operator for applying to the stepping circuit any one of several different combinations of impulses of different electrical characteristics, station selecting means at said stations selectively responsive to said combinations of impulses for rendering the traffic controlling devices at one particular station effective to respectively respond to succeeding impulses applied to said stepping circuit.

6. In a centralized traffic controlling system for railroads, a control office, a plurality of field stations, a stepping circuit extending from the control office through the several stations, traffic controlling devices and control means therefor at each station; means in the control office manually controllable by the operator for applying to this stepping circuit any one of a plurality of series of impulses of different electrical characteristics, a predetermined number of impulses of each series constituting a distinctive code call for one of the stations, and the succeeding impulses of that series corresponding to the desired controls for the traffic controlling devices at that station; station selecting means one at each of said stations selectively responsive to said code calls so as to be rendered effective when the code call for that station is applied to the stepping circuit; and circuit means at each station rendering the control means at that station respectively responsive to the succeeding impulses in a series when and only when the station selecting means at that station is rendered effective.

7. In a centralized traffic controlling system, a control office, a plurality of field stations, a stepping circuit extending from the control office through the several stations, means in the control office for impulsing said stepping circuit at time-spaced intervals, step-by-step means in the control office and at each station operated synchronously by the impulses on said stepping circuit, a message circuit extending from the control office through the several stations, means at each station controlled by the step-by-step means at that station for selectively opening or closing said message circuit at that station on each step in accordance with the message to be transmitted, and means in the control office responsive to the open or closed condition of said message circuit on each step.

8. In a centralized traffic controlling system for railroads, a control office, a plurality of field stations, a stepping circuit and a message circuit extending from the control office through the several stations, means in the control office for applying impulses to the stepping circuit, step-by-step means in the control office and at each station operated synchronously by the impulses on said stepping circuit, a source of current in the control office energizing the message circuit, a message relay in the control office included in said message circuit, and means at each station governed by the step-by-step means at that station for opening or closing the message circuit on each step in accordance with the indications to be transmitted from that station to the control office.

9. In a centralized traffic controlling system for railroads, a control office, a plurality of field stations, traffic controlling devices at each station having different operated conditions; and means including a stepping circuit and a message circuit, each extending from the control office through the several stations, for transmitting from the control office over said stepping circuit impulses to any one selected station for governing the operated conditions of said traffic controlling devices, and for simultaneously transmitting from any station to the control office over said message circuit indications of the operated conditions of the traffic controlling devices at that station.

10. In a centralized traffic controlling system for railroads, a control office, a plurality of field stations, a stepping circuit and a message circuit extending from the control office through the several staions, means in the control office manually controllable by the operator for applying to the stepping circuit one at a time a plurality of different combinations of impulses, each combination of impulses being a characteristic code call for one of said stations and the controls for that station, and means at each station for governing the energization of the message circuit on successive impulses applied to the stepping circuit to conform with the distinctive code call for that station and the indications to be transmitted from it to the control office.

11. In a centralized traffic controlling system for railroads, the combination with a control office and a plurality of field stations, of traffic controlling devices at each station, a stepping circuit extending from the control office through the several stations, means in the control office manually controllable for applying impulses to said stepping circuit to select said stations one at a time and govern the traffic controlling devices at the selected station, a message circuit extending from the control office through the several stations, and means effective during each impulse applied to the stepping circuit for simultaneously controlling the energization of said message circuit to register said stations in the control office one at a time and transmit indications of the operated conditions of the traffic controlling devices at the registered station.

12. In a centralized traffic controlling system, the combination with a control office and a plurality of field stations, a stepping circuit and a message circuit both energized from sources of current in the control office and extending from the control office through the several stations, controllable means in the control office for applying to said stepping circuit any one of the number of series of impulses of selected polarity, step-by-step means in the control office and at each station operated synchronously by said impulses regardless of their polarity, means at the stations selectively responsive to the different combinations of impulses of selected polarity, and means at each station governed by the step-by-step means at that station for controlling the energization of the message circuit.

13. In a centralized traffic controlling system, the combination with a control office and a plurality of field stations, a duplex coded communication system for simultaneously transmitting controls from the control office to a selected field station and indications from another field station to the control office, comprising a stepping circuit and a message circuit, means at the control office for energizing the stepping circuit with time-spaced current impulses in accordance with a distinctive code call for the station to be selected and the controls to be transmitted to that station, and means associated with each field station and governed by the current impulses on the stepping circuit for controlling the energization of the message circuit at said time-spaced intervals in accordance with the distinctive code call belonging to the corresponding station and the indications to be transmitted from that station to the control office.

14. In a centralized traffic controlling system for railroads, a control office, a plurality of field stations, a stepping circuit and a message circuit each extending from the control office through the several stations and both energized from sources of current at said control office, means at the control office under the control of the operator for applying any one of a plurality of series of impulses to said stepping circuit, a predetermined number of impulses of each series corresponding to a distinctive code call for one of said stations, the remaining impulses of each series corresponding with the controls to be transmitted to that station, and means associated with each station and governed by the series of impulses applied to the stepping circuit for controlling the energization of the message circuit on each impulse, said last mentioned means controlling the energization of the message circuit on said predetermined number of impulses in accordance with the code call of the corresponding station, and on the remaining impulses in accordance with the indications to be transmitted from that station to the control office.

15. In a system of the type described, a control office, a plurality of field stations, devices at each station to be controlled from the control office and having different operated conditions to be indicated in the control office, a stepping circuit and a message circuit extending from the control office through the several stations, manually controllable means in the control office for applying any one of a plurality of different series of current impulses of different electrical characteristics to said stepping circuit, a predetermined number of said impulses of each series constituting a distinctive code call assigned to one of said stations and the remaining impulses of that series corresponding to the controls desired for the devices in the corresponding station, step-by-step means in the control office and at each station operated synchronously by each series of impulses, station selecting means one at each station selectively responsive to said code calls and rendering said devices at that station responsive to the succeeding control impulses in that series, pulsing means at each station governed by said step-by-step means for controlling the energization of the message circuit during said predetermined number of impulses in accordance with the code call for that station and during the remaining impulses in accordance with the operated condition of the devices at that station, said pulsing means at any station being automatically rendered ineffective on any step whenever the condition of the message circuit fails to match the code call of that station, and means in the control office responsive to the condition of said message circuit on the successive steps for registering the sending station with a superior code call and the indications of the conditions of the devices at that station, whereby controls may be transmitted from the control office to any selected station simultaneously with the transmission of indications from that or any other station to the control office.

16. In a centralized traffic controlling system, a control office, a plurality of field stations, step-by-step means in the control office and at each station operated synchronously for a predetermined number of steps, a message circuit extending from the control office through the several stations, conditioning means at each station for distinctively controlling the energization of said message circuit on each step in accordance with a distinctive code call for that station, means at each station responsive to the condition of said message circuit on successive steps for rendering said conditioning means at that station ineffective whenever the condition of the message circuit on any step fails to match the code call for that station, and means in the control office responsive to the condition of said message circuit on the successive steps registering only the station at which said conditioning means operates throughout said steps.

17. In a centralized traffic controlling system for railroads, a control office, a plurality of field stations, step-by-step means in the control office and at each station operated synchronously, a message circuit connecting the control office and the several stations, means at each station governed by said step-by-step means at that station for controlling said message circuit on successive steps in accordance with a distinctive code call belonging to that station, and means including said message circuit for registering in the control office said stations one at a time in an order determined by the relative characteristics of the code calls for said stations.

18. In a centralized traffic controlling system for railroads, the combination with a control office and a plurality of field stations, of step-by-step means in the control office and at each station operated synchronously, a message circuit connecting the control office and the several stations, pulsing means at each station for controlling the energization of said message circuit on successive steps in accordance with a distinctive code call belonging to that station, said pulsing means at any such sending station being automatically rendered ineffective on any step if the condition of the message circuit on that step does not match the code call for that station, and station registering means in the control office goverened by the energization or deenergization of said message circuit on the successive steps.

19. A centralized traffic controlling system of the type described, a control office and a plurality of field stations connected by a series message circuit, stepping relays in the control office and at each station operated sequentially and synchronously from the control office, means at each station operable to open or close the message circuit on each step in accordance with a distinctive code call belonging to that station, and station registering means in the control office selectively responding to the open or closed condition of said message circuit on the successive steps.

20. In a centralized traffic controlling system for railroads, the combination with a control office and a plurality of field stations, of step-by-step means in the control office and at each station operated synchronously, a message circuit connecting the control office and the several stations, means in the control office governed by said message circuit for registering stations one at a time in accordance with the code calls allotted to them, and means associated with each station for impulsing the message line on successive steps in accordance with the code call for that station, said means at each station being effective only so long as the condition of the message circuit on all preceding steps corresponds with the code call for that station.

21. In a centralized traffic controlling system for railroads, the combination with a control office and a plurality of field stations, of step-by-step means in the control office and at each station operated synchronously, a message circuit connecting the control office and the several stations, devices at each station having different conditions to be indicated in the control office, a change device for each station operated from its normal condition upon any change in the condition of any of said devices at that station, pulsing means associated with each station effective only if its change device is in its operated condition for governing the energization of said message circuit on each step in accordance with a distinctive code call belonging to that station, said pulsing means at any station being rendered ineffective on any step whenever the condition of the message circuit on that step does not match the code call for that station, and means for maintaining said change device for each station in its operated condition until the pulsing means at that station has been effective for the full number of station selecting steps.

22. In a centralized traffic controlling system for railroads, the combination with a control office and a plurality of field stations, step-by-step means in the control office and at each station operated synchronously, a message circuit connecting the control office and the several stations, devices at each station having different conditions to be indicated in the control office, a change relay at each station energized upon any change in the condition of any of said devices, a station selecting relay at each station energized at the beginning of each operating cycle of the step-by-step means if the change relay at that station is then energized, means at each station effective only while the station selecting relay at that station is energized for opening or closing said message circuit on successive steps in accordance with a distinctive code call for that station, means at each station for maintaining said station selecting relay energized only so long as the energized or deenergized condition of the message circuit on successive steps corresponds with the code call for that station, and means for maintaining said change relay for each station energized until the station selecting relay at that station has been maintained energized for the full number of station selecting steps.

23. In a system of the type described, a control office, a field station, a stepping circuit and a message circuit connecting said control office and said station, stepping means in the control office and at the station operated synchronously by impulses on the stepping circuit, means at the station opening or closing the message circuit while the stepping circuit is energized for each step and maintaining the message circuit in such opened or closed condition during the subsequent deenergization of the stepping circuit, and indication means in the control office responsive only while the stepping circuit is deenergized to the open or closed condition of the message circuit for each step.

24. In a system of the type described, a control office, a field station, a stepping circuit connecting the control office and said station, means for energizing said stepping circuit with time-spaced impulses of selected polarity, stepping means at the station responding to the impulses of said stepping circuit irrespective of their polarity, impulse storing means at the station operable only while the stepping circuit is energized and conditioned in accordance with the polarity of said impulses, and controlling means at the station governed on each step of said stepping means by said impulse storing means after each impulse and only while the stepping circuit is deenergized.

25. In a system of the character described, a control office, a field station, control devices at the station, a stepping circuit between the control office and said station, means in the control office for energizing said stepping circuit with time-spaced impulses of selected polarity, and means for governing said control devices one at a time in accordance with the polarity of the successive impulses, said last mentioned means being effective after each impulse and only when said stepping circuit is deenergized.

26. In a system of the character described, a control office, a plurality of field stations, a stepping circuit extending from the control office through the several stations, means in the control office for energizing said stepping circuit with a series of time-spaced impulses of selected polarity, and means at each station operated by each impulse to a different position in accordance with the polarity of that impulse and maintained in its operated position after each impulse until the next succeeding impulse.

27. In a system of the type described, a control office, a plurality of field stations, a stepping circuit extending from the control office through the several stations, means in the control office for energizing said stepping circuit with a series of time-spaced impulses of selected polarities, and a bank of stepping relays at each station operated synchronously one at a time and one for each time the stepping circuit is energized by an impulse irrespective of the polarity of that impulse.

28. In a system of the character described, the combination with a stepping circuit energized with time-spaced impulses of variable polarities, a line relay energized by each impulse regardless of its polarity, a plurality of stepping relays, a single half-step relay governed by said stepping relays and shifted from its existing position to the other position upon each deenergization of said line relay, and means including said line relay and said half-step relay for energizing said stepping relays one at a time, each time said line relay is energized.

29. In a centralized traffic controlling system for railroads, a plurality of stations, a circuit connecting said stations, step-by-step means operated synchronously at each of said stations through a predetermined number of steps, automatic means at one of said stations including contacts of said step-by-step means at that station for placing an impulse of current on said circuit for each of said predetermined number of steps, said means determining the distinctive character of each of said impulses, whereby a certain number of distinctive code call combinations of impulses may be placed on said circuit, said number being equal to the number of different characters of impulses raised to the power of the predetermined number of steps, and means at said stations including contacts of said step-by-step means at the respective station and governed in accordance with said code call combinations of impulses on said circuit.

30. In a centralized traffic controlling system for railroads, a plurality of stations, a circuit connecting said stations, means placing a plurality of distinctive series of positive and negative impulses on said circuit each series comprising a predetermined number of impulses, means determining whether each particular impulse of a series shall be positive or negative, whereby the number of said distinctive series constituting said plurality of series is equal to two raised to the power of a number equal to the predetermined number of impulses in a series, and means at each station energized at the beginning of each series of impulses, only one of which means is maintained energized after said predetermined number of impulses has been transmitted dependent upon the particular distinctive series of impulses which is placed on said circuit.

31. In a centralized traffic control system for railroads, a control office, a plurality of field stations, a line circuit connecting the control office and the field stations, means placing a plurality of distinctive series of positive and negative impulses on said circuit each series comprising a predetermined number of impulses, means determining whether each particular impulse of a series shall be positive or negative, whereby the number of said series constituting said plurality of distinctive series is equal to two raised to the power of a number equal to the predetermined number of impulses in a series, a step-by-step means at each of said field stations operated through cycles of operation comprising a predetermined number of steps, two code buses at each of said stations one or the other of which is energized on each of the predetermined number of steps in accordance with a particular code pattern assigned to the corresponding station, a station selecting relay at each of said stations having pick-up and stick circuits, means closing said pick-up circuits of said station selecting relays at each of said stations only at the beginning of each cycle of operation, and means connecting said stick circuits of said station selecting relays to one or the other of said code buses at the corresponding station in accordance with whether said line circuit is energized with a positive or a negative impulse on the corresponding step, whereby a particular station selecting relay is maintained energized through only those cycles of operation in which the positive and negative impulses are applied to said line circuit in such a combination as to correspond with the code combination assigned to the corresponding station.

32. In a centralized traffic controlling system for railroads, a control office, a plurality of field stations, a line circuit connecting said control office with said field stations, a step-by-step means at each of said stations operated through cycles of operation comprising a predetermined number of steps, a plurality of code buses at each of said stations, a particular one of which is energized at each of said stations on certain of the predetermined number of steps in accordance with a particular code pattern, a station selecting relay at each of said stations having pick-up and stick circuits, means closing said pick-up circuit of each of said station selecting relays only at the beginning of each cycle of operation, means manually controllable in the control office for placing a plurality of distinctive impulses on said line circuit, and means connecting said stick circuit of each of said station selecting relays to a particular one of said code buses at the corresponding station on each of said predetermined number of steps in accordance with the distinctive character of the impulses placed on said line circuit, whereby any particular one of said station selecting relays is maintained energized through only those cycles of operation in which the character of the distinctive impulses placed on said line circuit is such as to connect said stick circuit of that particular station selecting relay to those particular code buses at the corresponding station which are energized on said predetermined steps.

33. In a centralized traffic controlling system for railroads, a control office, a plurality of field stations, a line circuit connecting said control office with said field stations, a step-by-step means at each of said field stations operated through cycles of operation comprising a predetermined number of steps, a plurality of code buses at each of said stations, a particular one of which is energized at each of said stations on each of the predetermined number of steps in accordance with a particular code pattern, a station selecting relay at each of said stations having pick-up and stick circuits, means closing said pick-up circuit of each of said station selecting relays only at the beginning of each cycle of operation, means at the control office placing a plurality of impulses of distinctive character on the line circuit connecting the control office and the field stations, and means at each station connecting said stick circuit of said station selecting relay at the corresponding station to a particular one of said code buses at the corresponding station on each of said predetermined number of steps in accordance with the distinctive character of the impulses placed on said line circuit, whereby any particular one of said station selecting relays is maintained energized through only those cycles of operation in which the character of the distinctive impulses placed on said line circuit are such as to connect its stick circuit to those particular code buses at the corresponding station which are energized on corresponding steps.

34. In a centralized traffic controlling system for railroads, a field station equipment connected to a line circuit extending to a distant control office, a step-by-step means at the field station operated through cycles of operation comprising a predetermined number of steps, a plurality of code buses at said station one of which is energized on certain of the predetermined number of steps in accordance with a particular code pattern, a station selecting relay having pick-up and stick circuits, means closing said pick-up circuit only at the beginning of each cycle of operation, and means connecting said stick circuit to a particular one of said code buses on each of said predetermined number of steps in accordance with the character of distinctive impulses placed on said line circuit, whereby said station selecting relay is maintained energized through only those cycles of operation in which the character of impulses placed on said line circuit are such as to connect said stick circuit to those particular code buses which are energized on corresponding steps.

35. In a communication system of the code type, a plurality of stations, a stepping circuit interconnecting the stations, step-by-step means at each station operated by time spaced impulses on said stepping circuit, means for energizing said stepping circuit with time spaced impulses, means for determining the characteristics of said time spaced impulses, storing means at each field station operable only while the stepping circuit is energized and conditioned in accordance with the characteristic of the corresponding impulse, and control means at each station being governed on each step of the step-by-step means at the corresponding station in accordance with the condition of said storing means on the corresponding step only while the stepping circuit is deenergized.

36. In a centralized traffic controlling system for railroads, a control office, a plurality of field stations, a stepping circuit and a message circuit connecting said control office and said field stations, a step-by-step means at the control office and at each field station operated synchronously by impulses on said stepping circuit, means at the station opening or closing said message circuit while said stepping circuit is energized for each step and maintaining the message circuit in such open or closed condition during the succeeding deenergization of the stepping circuit, and means in the control office and at each field station responsive to the open or closed condition of said message circuit only while said stepping circuit is deenergized.

37. In a centralized traffic controlling system for railroads, a control office and a plurality of field stations, a message circuit connecting said control office and said field stations, means at each field station for conditioning said message circuit with any one of a plurality of distinctive conditions, with said distinctive conditions having relative degrees of superiority, whereby a more superior condition imposed by a station on said message circuit cancels all inferior conditions imposed on said message circuit by any of the remaining stations, and means at the control office and at each field station for indicating the surviving condition imposed on said message circuit.

38. In a centralized traffic controlling system for railroads, a control office and a plurality of field stations, a message circuit connecting said control office and said field stations, means at each field station for normally conditioning said message circuit with an inferior condition, means at each station for conditioning said message circuit with a superior condition, whereby said superior condition being imposed on said circuit by any one of several stations cancels the inferior condition imposed by the remaining stations, and means at the control office and at each of the field stations for indicating said inferior and superior conditions on said message circuit.

39. In a centralized traffic control system for railroads, a stepping circuit, a three condition line relay means included in said stepping circuit, means for impressing a plurality of series of distinctive impulses on said stepping circuit, a cycle demarking relay having contacts picked up on the first impulse of each series of impulses and dropped at the end of each series of impulses, a neutral impulse repeating relay energized each time said line relay means is energized irrespective of the character of the impulse on said stepping circuit and deenergized each time said line relay means is deenergized, a half step relay having a half step contact operable to either of two positions, a series of stepping relays the first of which can only be picked up if said cycle demarking relay is deenergized, a pick-up circuit for each odd numbered stepping relay including a front contact of said impulse repeating relay and said half step contact in one of its positions, a pick-up circuit for each even numbered stepping relay including a front contact of said impulse repeating relay and said half step contact in the other of its positions, circuit means for said half step relay including a back contact of said impulse repeating relay and front contacts of said stepping relays, whereby said stepping relays are picked up successively upon successive energizations of said impulse repeating relay and whereby said half step relay actuates its half step contact to opposite positions upon successive deenergizations of said impulse repeating relay, and means controlled on each step taken by said stepping relays in accordance with the character of the impulses on said stepping circuit as repeated by said three condition line relay means.

40. In a code type communication system, means for transmitting a plurality of different series of distinctive impulses each series comprising a different code, a plurality of impulse character determining means, and means rendering only one of said impulse character determining means effective for any particular series of impulses, said means including a starting button for each different series, said starting buttons being arranged in order, a storing relay for each starting button having a pick-up circuit closed whenever its corresponding starting button is actuated, a code selecting relay for each storing relay, a cycle controlling relay picked up whenever a series of impulses is being transmitted, a last step relay picked up on the last impulse of each different series of impulses, a pick-up circuit for each code selecting relay including a front contact of its corresponding storing relay, a back contact of each storing relay of decreasing order, a back contact of each code selecting relay of increasing order and a back contact of said cycle controlling relay, a stick circuit for each code selecting relay including its own front contact, a front contact of its corresponding storing relay and a back contact of each code selecting relay of increasing order, and a stick circuit for each storing relay including its own front contact and a back contact of said last step relay only when its corresponding code selecting relay is picked up.

41. In combination, a control office and a plurality of field stations, a stepping circuit connecting said control office and said field stations, means for impressing a plurality of series of distinctive impulses on said stepping circuit, a cycle demarking relay at each field station picked up on the first impulse of each series and dropped at the end of the last impulse of each series, a station selecting relay at each field station conditioned on the first impulse only before said cycle demarking relay is picked up, and means rendering said station selecting relay selectively responsive to the characters of the succeeding impulses when said cycle demarking relay is picked up.

42. In combination, a line circuit having a plurality of series of impulses applied thereto, a neutral line repeating relay for repeating the energized and deenergized conditions of said line circuit, a selecting relay picked up at the beginning of each series of impulses, a holding stick circuit for said selecting relay closed when said line repeating relay is picked up, and a selecting stick circuit for said selecting relay capable of being selectively opened or closed when said line repeating relay is deenergized whereby said selecting relay may be deenergized only when said line repeating relay is deenergized.

43. In combination, a line circuit having a plurality of series of distinctive impulses applied thereto, a three position polarized line relay included in said line circuit, a neutral line repeating relay for repeating the energized and deenergized conditions of said line circuit, a slow acting relay picked up upon the first impulse of each series and dropped at the end of the last impulse of each series, said slow acting relay being sufficiently slow acting to maintain its contacts in picked up positions between successive impulses of any series, a selecting relay having a pick-up circuit including a front contact of said neutral line repeating relay and a back contact of said slow acting relay, a holding stick circuit for said selecting relay closed when said neutral line repeating relay is picked up, and a selecting stick circuit for said selecting relay capable of being selectively opened or closed when said line repeating relay is deenergized, whereby said selecting relay may be selectively deenergized only when said line repeating relay is deenergized.

44. In combination, a line circuit having a plurality of series of distinctive impulses applied thereto, a three position polarized line relay included in said line circuit, a neutral line repeating relay for repeating the energized and deenergized conditions of said line circuit, a slow acting relay picked up upon the first impulse of each series and dropped at the end of the last impulse of each series, said slow acting relay being sufficiently slow acting to maintain its contacts in picked up positions between successive impulses of any series, a bank of stepping relays controlled by said neutral line repeating relay so as to take one step for each impulse repeated by said neutral line repeating relay, a selecting relay having a pick-up circuit including a front contact of said neutral line repeating relay and a back contact of said slow acting line repeating relay, a holding stick circuit for said selecting relay closed when said neutral line repeating relay is picked up, and a selecting stick circuit for said selecting relay selectively opened or closed on each step taken by said stepping relay bank, whereby said selecting relay may be selectively maintained energized or deenergized only when said line repeating relay is deenergized.

45. In combination, a line circuit having a plurality of series of distinctive impulses applied thereto, a three position polarized line relay included in said line circuit, a neutral line repeating relay for repeating the energized and deenergized conditions of said line circuit, a slow acting relay picked up upon the first impulse of each series and dropped at the end of the last impulse of each series, said slow acting relay being sufficiently slow acting to maintain its contacts in picked up positions between successive impulses of any series, a bank of stepping relays controlled by said neutral line repeating relay so as to take one step for each impulse repeated by said neutral line repeating relay, a selecting relay having a pick-up circuit including a front contact of said neutral line repeating relay and a back contact of said slow acting relay, a holding stick circuit for said selecting relay closed when said neutral line repeating relay is picked up, and a selecting stick circuit for said selecting relay selectively opened or closed on each step in accordance with the distinctive character of the preceding impulse on said line circuit, whereby said selecting relay may be selectively maintained energized or deenergized on each step in accordance with each impulse of the series of impulses only when said line repeating relay is deenergized.

46. In a centralized traffic control system for railroads, a line circuit having a plurality of distinctive impulses impressed thereon, step-by-step means operated through a predetermined number of steps in synchronism with the impulses placed on said line circuit, a plurality of pilot relays, one of said relays being picked up or left deenergized on each step taken by said step-by-step means dependent upon the character of the impulse on said line circuit, a stick circuit for each of said pilot relays including its own front contact and a contact opened only at the end of said predetermined number of steps, a plurality of station registering relays, each relay having a selecting circuit through said plurality of pilot relays, the greatest number of different selections for any one number of said pilot relays being the number of distinctive characters of the impulses on said line circuit raised to the power of the number of pilot relays, whereby only one particular station registering relay is selected for any one series of impulses placed on said line circuit.

47. In a centralized traffic controlling system, a line circuit connecting a control office with a plurality of field stations, means for sending a series of impulses in a code combination constituting a distinctive code call for a particular station over said line circuit, code circuits at said field station, selecting means at said field station, a relay intermittently operated by said impulses, means including said relay for initially energizing said selecting means, and means including said code circuits for maintaining said selecting means energized only if said series of impulses is applied to said line circuit.

48. In combination, a line relay for receiving a series of distinctive impulses over a line circuit, a series of odd and even counting relays for counting said impulses, a circuit prepared by an operated odd counting relay for the next even counting relay in the series, a circuit prepared by an operated even counting relay for the next odd counting relay in the series, and a common relay controlled by each operated counting relay for completing said prepared circuit only upon the next impulse of said series received by said line relay, and means controlled, when a counting relay is operated, in accordance with the distinctive character of the impulse for that counting relay.

49. In a centralized traffic controlling system, a control office, a plurality of field stations, a line circuit connecting said control office with said field stations, station selecting means at each field station, step-by-step mechanism at each field station for selecting a plurality of code connections, means controlled by a series of positive and negative impulses of current in said line circuit for advancing said mechanism through an operating cycle, step-by-step irrespective of the polarity of such impulses, there being a plurality of operating periods during which impulse current flows in said line circuit, and a registering period following each operating period, means for storing during each registering period the polarity of each preceding impulse of current, means effective during each of said operating periods for holding said station selecting means energized only if it is energized at the beginning of such operating period, and means effective during each of said registering periods for holding said station selecting means energized only at the station where the code connections for each step correspond to said stored polarity for that step.

50. In a centralized traffic controlling system for railroads, a stepping circuit energized with a series of time spaced positive or negative impulses to comprise a code, a line relay for repeating each impulse in accordance with its character, a line repeating relay for repeating each impulse without distinguishing its character, a bank of stepping relays, means for operating a different one of said stepping relays for each successive impulse as repeated by said line repeating relay, a plurality of local channel circuits and at least one prepared upon the operation of each stepping relay, means distinctively energizing said channel circuit for each stepping relay in accordance with the character of impulse repeated by said line relay, and electro-responsive means controlled by the distinctive energization of each of said channel circuits.

51. In combination, a line circuit having a series of time spaced impulses applied thereto, a two position line repeating relay for repeating each impulse and each time space of said series, a bank of neutral stepping relays, a two position half-step relay, means including said half-step relay for initially energizing a stepping relay each time said line repeating relay is actuated to one of its positions, means for maintaining energized said initially energized stepping relay only until the next succeeding stepping relay in the bank is energized, means including said bank of stepping relays for actuating said half-step relay to an opposite position each time said line repeating relay is actuated to the other of its positions, and a plurality of channel circuits closed sequentially by said bank of stepping relays.

52. In a centralized traffic controlling system for railroads, a control office, a field station, a line circuit connecting said control office with said field station, a plurality of traffic controlling devices at said field station, a plurality of control levers at said control office corresponding to said traffic controlling devices, means for impressing a series of impulses on said line circuit having positive or negative polarities in accordance with the positions of said levers, a polar neutral relay at said field station repeating the polarity of each impulse of said series, a neutral relay at said field station controlled by said polar relay and repeating each impulse of said series irrespective of its polarity, a series of stepping relays at said field station operated step-by-step by said neutral relay, and an electro-responsive device at the field station for each step and controlled by said polar relay on that step in accordance with the polarity of the impulse repeated thereby, said electro-responsive devices governing the operation of said traffic controlling devices.

53. In a centralized traffic controlling system for railroads; a control office; a field station; a line circuit connecting said control office with said field station; means at the control office for impressing a series of time spaced impulses on said line circuit and including manually governable means for selectively determining the polarity of each impulse of said series; step-by-step means at said control office and at said field station; a neutral relay at said control office and another at said field station, each repeating the impulses of said series irrespective of the polarity of such impulses; means controlled by said neutral relays for causing their respective step-by-step means to operate one step for each impulse; a polar relay at said field station repeating the polarity of each impulse of said series, and an electro-responsive device at the field station for each step and controlled by said polar relay on that step in accordance with the polarity of the impulse repeated thereby.

54. In a centralized traffic controlling system for railroads; a control office; a field station; a line circuit connecting said control office with said field station; means for periodically opening and closing said line circuit to impress a series of time spaced impulses thereon; step-by-step means at said control office and at said field station; a polarity determining relay selectively positioned during each time space for each step to determine the polarity of the next impulse; means for maintaining said polarity determining relay in its last position during each impulse irrespective of the operation of said step-by-step means in response to such impulse; a neutral relay at said control office and another at said field station, each repeating the impulses of said series irrespective of the polarity of such impulses; means controlled by said neutral relays for causing their respective step-by-step means to operate one step for each impulse, manually governable means at said control office for selectively determining the position of said polarity determining relay for each step; a polar relay at said field station repeating the polarity of each impulse of said series, and an electro-responsive device at the field station for each step and controlled by said polar relay on that step in accordance with the polarity of the impulse repeated thereby.

55. In a centralized traffic controlling system for railroads, a control office, a plurality of field stations, a control line circuit extending from said control office through said field stations, step-by-step means at the control office and at each field station all operated in synchronism by impulses on said control line circuit regardless of their polarity, a plurality of control devices at each field station to be conditioned in accordance with the polarity of the impulses on said control line circuit for certain steps of said step-by-step means, impulsing means at said control office for opening and closing said control line circuit to apply positive or negative impulses on said circuit, means at the control office for governing said impulse transmitting means on each step of said step-by-step means at the control office to determine whether the next impulse shall be positive or negative in character, and station selecting means at each station selectively controlled on each step of other steps of the step-by-step means at that station in accordance with the positive or negative character of the impulse for that step, said station selecting means for each station being effective at the end of said other steps only for a particular combination of impulses characteristic of that station, and if effective, rendering said control devices at that station responsive to the character of the impulses on said certain steps of said step-by-step means.

56. In a centralized traffic controlling system for railroads, a control office, a plurality of field stations, a line circuit connecting the control office with the field stations, means in the control office for impressing different series of positive and negative current impulses on said line circuit, each series having a predetermined number of impulses, and differing from all the other series in the polarity of at least one of said impulses, step-by-step means at each of said field stations operated in response to said impulses, a plurality of code jumpers at each of said stations arranged in distinctive manner for that station, a station selecting relay at each of said stations and provided with a pick up circuit and a stick circuit, means closing said pick up circuit only at the beginning of each series of impulses, and means closing said stick circuit at each station on each step of its step-by-step means only when the polarity of an impulse on the line circuit for that step corresponds to the position of the particular code jumper rendered effective for that step by said step-by-step means.

57. In a centralized traffic control system for railroads; a control office; a plurality of field stations; a line circuit connecting the control office with all of the several field stations; means at the control office for applying to said line circuit any one of a plurality of different series of impulses, the first impulse of each series being prolonged and each of the succeeding impulses being positive or negative to provide a code call allotted to a particular field station, said code call for each station differing from all others in the positive or negative character of at least one of said impulses; a three-position polarized line relay included in said line circuit; a neutral relay controlled by said polarized line relay so as to be energized on each impulse irrespective of its polarity and deenergized between the impulses; a slow acting relay picked up upon the first or prolonged impulse of each series and dropped at the end of the last impulse of each series, said slow acting relay being sufficiently slow acting to maintain its contacts picked up between successive impulses of any series; step-by-step means controlled by said neutral line repeating relay so as to take one step for each impulse on said line circuit; a station selecting relay having a pick-up circuit including a front contact of said neutral relay and a back contact of said slow acting relay; a stick circuit for said station selecting relay closed during each step of said step-by-step means only if the polarity of the impulse for that step corresponds to the code call assigned to that station; and another stick circuit for maintaining said station selecting relay energized during the change of said step-by-step means between the steps; whereby said station selecting relay may be selectively maintained energized or deenergized on each step in accordance with whether the impulse for that step corresponds to the character of the code call assigned to that station.

58. In a system of the character described for transmitting a plurality of controls from a control office to any one of a plurality of field stations during a given operating cycle of transmission; line wires connecting the control office and the several field stations; means in the control office manually controllable to govern distinctively the energization in said line wires at a plurality of successive time intervals to form any one of a number of distinctive code calls, one for each station, and a plurality of controls for such station, each station code call comprising a plurality of code elements and differing from all others in the character of at least one code element; station selecting means at each station including a stick relay initially energized only at the beginning of the transmission of any station code call, means including a stick circuit for said relay for maintaining it energized throughout the transmission of a code call and controls only if each of the successive code elements of the station code call allotted to that particular station; and control means at each station responsive to controls transmitted over said line wires only if said stick relay at that station is then energized.

59. In a centralized traffic control system; a control office; a plurality of field stations; line wires connecting the control office and the several field stations; means in the control office operable from time to time to control distinctively the energization of said line wires at a plurality of successive time intervals to provide any one of a number of distinctive station code calls, one for each station, and each code call comprising a plurality of code elements and differing from all others in the character of at least one code element; a station selecting relay at each station; a pick-up circuit for said station selecting relay for initially and temporarily energizing such relay only at the beginning of the transmission of a station code call; and means including a stick circuit for said station selecting relay for maintaining it energized throughout such transmission only if the successive code elements transmitted correspond with the code elements of the code call allotted to that particular station.

60. In a centralized traffic control system of the character described for transmitting a plurality of controls to any selected one of a plurality of field stations over line wires connecting the control office and the field stations; means in the control office manually controllable to act during an operating cycle of transmission to control distinctively the energization of said line wires at a number of successive time intervals to provide a station code call and a plurality of controls, each station code call comprising a plurality of code elements and differing from all other code calls in the character of at least one code element; step-by-step means at each station operated synchronously with respect to the transmission of the successive code elements of the station code call and controls; a station selecting stick relay at each station energized temporarily at the beginning of each operating cycle of transmission; electrical connections at each station arranged in accordance with the code call allotted to that station; a stick circuit for said station selecting relay; means including said step-by-step means and said electrical connections at each station for maintaining said stick circuit closed for each of the successive code elements of the station code call being transmitted only if each such code elements correspond with those of the station code call allotted to that station; and means including a stick circuit for maintaining said station selecting relay at each station energized at time intervals of change of said step-by-step means to render the maintained energization of said station selecting relay dependent upon the character of the code element.

61. In a centralized traffic controlling system for railroads, a control office, a plurality of field stations each including a power-operated track switch and signals governing train movement to and fro over said switch, a control line circuit extending from the control office through the several field stations, a plurality of code jumpers and control levers for each of said field stations, means at the control office for applying positive and negative impulses to said line circuit in accordance with the code jumpers and existing position of the control levers for a particular station to form a code call characteristic of that station and controls for the track switch and signals at that station, step-by-step means at each of said stations operated synchronously in response to impulses on said line circuit one step for each impulse, a station selecting relay at each of said stations controlled on certain steps of said step-by-step means in accordance with the polarity of the impulses for such steps so as to be energized after transmission of a code call only when the impulses on said line circuit form the code call characteristic of that station, separate electro-responsive devices at each of said stations individually actuated on the other control steps of said step-by-step means in accordance with the control impulses for those steps only if the station selecting relay at that station is then energized, said electro-responsive devices for each station governing the operation of said track switch and the clearing of a signal for train movement over said switch in one direction or the other.

62. In a centralized traffic controlling system for railroads; a control office; a plurality of field stations each including a power operated track switch and signals governing train movement to and fro over said switch, a control line circuit extending from the control office through the several field stations; a bank of stepping relays at the control office and at each of said field stations operated step-by-step in response to impulses on said control line circuit; a plurality of code jumpers and a plurality of control levers at said control office for each of said field stations, said control levers for a particular field station corresponding respectively to said track switch and signals at that field station; means including said stepping relay bank at said control office for rendering the code jumpers and control levers for any particular station successively effective to impress a positive or negative impulse on said line circuit to form a series of impulses comprising a station code call and control impulses; a station selecting relay at each station energized at the beginning of each series of impulses and maintained energized on each step of said stepping relay bank at that station during the code call impulses only if these impulses form a code call belonging to that station; and electro-responsive devices at each field station separately controlled on the control steps in accordance with the polarity of the impulses for such steps only if said station selecting relay is then energized, said electro-responsive devices governing the operation of said track switch and the clearing of the signals for train movement in one direction or the other over said switch.

63. In a centralized traffic controlling system for railroads, a control office, a plurality of field stations, a control line circuit extending from the control office through the several stations and including a line relay at each station, step-by-step means in the control office and at each station controlled by its respective line relay to operate in synchronism in response to the impulses on said control line circuit, impulsing means for opening and closing said line circuit only at the control office and for energizing said line circuit with positive or negative impulses, means at the control office for governing said impulsing means on each step of said stepping mechanism to determine the positive or negative character of the next impulse in accordance with a particular code call, and controls to be transmitted, station selecting means at each of said stations selectively responsive on each step to the positive or negative character of the impulses for that step so as to be effective at the end of a predetermined number of steps only when the character of the impulses for such steps have corresponded with the distinctive code call belonging to that station, and control means at each station responsive to the polarity of other impulses only if said station selecting means at that station is effective.

64. In a centralized traffic controlling system for railroads, a control office, a field station, a line circuit connecting said control office with said field station, a power operated track switch and signals at said field station, a plurality of control levers at said control office corresponding to said switch and signals, means for applying a series of impulses on said line circuit each having a positive or negative polarity in accordance with the positions of said levers, a three-position polarized relay at said field station included in said line circuit for repeating the polarity of each impulse of said series, a neutral relay at said field station controlled by said polar relay so as to be energized on each impulse of said series irrespective of its polarity and to be deenergized between the impulses, a series of stepping relays at said field station operated step-by-step in response to the operation of said neutral relay, electro-responsive devices at the field station for separately governing said switch and signals, and circuit means for controlling an electro-responsive device on each step in accordance with the polarity of the impulse for that step.

65. In a system of the character described for transmitting controls from a control office to a remote field station; a line circuit connecting the control office and the field station; means in the control office manually controllable to energize said line circuit with a plurality of successive negative or positive impulses in accordance with the controls to be transmitted; a plurality of control electro-responsive devices in the field station, there being one device for each of said impulses applied to said line circuit; a bank of stepping relays at the field station energized sequentially one at a time for each of said impulses for establishing energizing circuits for said electro-responsive devices, one at a time; and relay means at the field station responsive to the polarity of energization of said line circuit for successively energizing said electro-responsive devices distinctively from a local source of current over said energizing circuits to conform with the polarity of energization of said line circuit for the corresponding station.

66. In a system of the character described for transmitting controls from a control office to a remote field station, a line circuit connecting the control office and the field station, means in the control office controllable to energize said line circuit with a plurality of successive negative or positive impulses in accordance with the controls to be transmitted, a line relay at the field station responsive to the polarity of the energization of said line circuit, a bank of stepping relays at the field station energized sequentially one at a time for each of said impulses, a plurality of control relays responsive to the polarity of their energization and remaining in their operated condition after deenergization until subsequently changed, and an energizing circuit for each of said control relays having a contact of a corresponding stepping relay and a contact of said line relay at the field station and supplied with current of one polarity or the other from a local source dependent upon the polarity of energization of said line circuit for the corresponding step, said energizing circuits for said control relays being energized in succession by the operation of said stepping relays.

67. In a centralized traffic controlling system, a control office, a plurality of field stations. a stepping circuit extending from the control office through the several stations, step-by-step means in the control office and at each station synchronously operable by impulses on said stepping circuit, an indication line circuit extending from the control office through the several stations, a plurality of code jumpers at each of said stations, the code jumpers for each station being differently arranged from every other station, a plurality of traffic devices at each of said stations, circuit means at each station including contacts of said step-by-step means at that station for successively rendering said code jumpers and said traffic devices effective for opening or closing said indication line circuit in accordance with the condition of the code jumpers and traffic devices, a series of registering relays in the control office, and circuit means including contacts of said step-by-step means at the office for controlling said registering relays successively in accordance with the opened or closed condition of said indication line circuit, whereby any particular field station with its indications can be registered in the control office.

68. In a system of the character described for transmitting indications from several field stations only one station at a time to a distant control office; line wires connecting said control office and the several stations; changeable devices at said stations, the condition of which is to be indicated in the control office; starting means at each station rendered effective upon a change in any device at that station; transmitting means at each station initiated by its starting means not tending to impose any one of a plurality of distinctive conditions upon said line wires during successive time periods for station identification, said distinctive conditions being in accordance with the station code call belonging to the station, said transmitting means also acting if its operation is continued to impose distinctive conditions upon said line wires as indications of the condition of the devices at that station; means for maintaining said transmitting means effective only so long as the condition of said line wires during each of said successive time periods for station identification matches the code call for that station; means for restoring each of said starting means only after its corresponding transmitting means has been effective throughout the station identification time periods; station registration means in the control office responsive to the condition of said line wires during each of said time periods for registering the particular station at which said transmitting means makes a complete operation; and indication responsive means in the control office belonging to each station and governed in accordance with the indications transmitted from that station when that station has been registered by said registration means.

69. In a centralized traffic control system; a control office; a plurality of field stations; a line circuit connecting said control office and the several field stations; movable devices at said stations to be indicated in the control office; starting means at each field station actuated by movement of any of said devices at that station; transmitting means at each station rendered effective by the actuation of its starting means for creating distinctive conditions of said line circuit during successive time periods of station identification in accordance with the station code call characteristic of that station, and during other time intervals in accordance with the existing condition of said devices to be indicated, said transmitting means at any station remaining effective only so long as the particular condition of said line circuit at any time matches its station code call, said starting means at each station remaining in its actuated condition until said transmitting means for that station has operated throughout said time periods of station identification; and means in the control office for registering only the station at which said transmitting means made a complete operation, and for controlling indication devices belonging to that station; whereby if indications are ready to be transmitted from two or more stations, indications will be received from such stations, one at a time, in an order determined by the character of the code calls allotted to such stations.

70. In a system for transmitting indications to a control office from a plurality of field stations only one station at a time to a distant control office, a message circuit connecting all of said stations and the control office, indication transmitting equipment at each field station comprising, a bank of stepping relays operated sequentially one at a time, a pulsing relay for opening said message circuit, means including code jumpers characteristic of the station for energizing or deenergizing said pulsing relay on each step in accordance with the code elements of a distinctive code identifying the station, a message relay in said message circuit responsive to the continuity of that circuit as determined by the pulsing relay at the station or the pulsing relay at any other station that may be operating, a station selecting stick relay for indications initially energized at the beginning of the operation of the stepping relays when indications are to be transmitted, and a stick circuit for said station selecting relay governed by said stepping relays and including contacts of said message relay and said code connections for each step in turn, whereby the stick circuit for said station selecting relay is broken and said relay remains denergized until the beginning of any subsequent operation of the stepping relays whenever the condition of said message relay on any step fails to match the code connections for that step.

71. In a system for transmitting indications from a plurality of field stations only one station at a time to a distant control office; line wires connecting said control office and the several stations; indication transmitting equipment at each station comprising a transmitting relay for distinctively governing the energized condition of said line wires to produce a code element, a station selecting relay for indications, a bank of stepping relays operated sequentially one at a time, means including contacts of said stepping relays and code connections and effective only if said station selecting relay is energized for operating said transmitting relay to produce a series of code elements constituting a code identifying that station, a plurality of changeable devices assuming different conditions to be indicated in the control office, starting means responsive to the change in any one of said devices for initially energizing said station selecting relay, means including a stick circuit for maintaining said station selecting relay energized only if the code element on said line wires on each of said steps matches said code connections, and means for restoring said starting relay only if said station selecting relay is maintained energized throughout the operation of said stepping relays.

72. In combination, a line circuit having a series of time spaced impulses applied thereto, a line repeating relay energized for each impulse and deenergized for each time space of said series, a slow acting cycle demarking relay having contacts picked up on the first impulse of said series and dropped only after the last impulse of said series, a bank of neutral stepping relays, a two-position half step relay, pick up circuits for alternate ones of said stepping relays including said line repeating relay in one of its positions and said half step relay in one of its positions, pick up circuits for the remaining stepping relays including said line repeating relay in one of its positions and said half step relay in the other of its positions, stick circuits for said stepping relays including a front contact of said slow acting cycle demarking relay, circuit means including contacts of said stepping relays and said line repeating relay in the other of its positions for actuating said half step relay from its then existing position to the other position each time said line repeating relay is actuated to said other of its positions, and a plurality of channel circuits closed sequentially by said bank of stepping relays.

73. In a system of the character described, in combination with a line circuit and a line relay intermittently energized and deenergized, of a bank of stepping relays, a pick-up circuit for each stepping relay including a front contact of the next preceding stepping relay, a single half-step relay common to said bank, and circuit means causing said half-step relay to be operated after energization of each stepping relay upon movement of the line relay to its other position to prepare the pick up circuit for the next succeeding stepping relay, said half-step relay and said line relay cooperating to cause sequential energization of said stepping relays one at a time with an operation of the half-step relay after the energization of each stepping relay and prior to the energization of the next succeeding stepping relay, whereby a bank of stepping relays for a given number of steps comprises as many relays as there are steps together with a single half-step relay.

74. In a system of the character described, the combination with a line circuit connecting a plurality of stations and a line relay in said circuit at each station intermittently energized and deenergized, of stepping means at each station operated from a local source of current and controlled by the operation of said line relay comprising, a bank of stepping relays, a pick up circuit for each stepping relay including a front contact of the next preceding relay and a contact of said line relay closed in one particular condition of said line relay, a half-step relay common to said bank operable in its two different shifted positions to control the energization of the pick up circuits for alternate stepping relays, means for shifting said half-step relay from its existing position to the other upon operation of said line relay to its other position following the energization of a stepping relay, a slow acting relay maintaining a contact closed during intermittent operation of said line relay, and stick circuits for said stepping relays controlled by said slow-acting relay.

75. In a system of the character described, the combination with a line circuit connecting a plurality of stations and a line relay in said circuit at each station intermittently operated from one particular position to another position, of step-by-step means at each station operated synchronously and comprising, a bank of stepping relays to be energized sequentially one at a time each time said line relay is operated to its said particular position, an energizing circuit for each stepping relay including a front contact of the next preceding stepping relay in said bank and closed at one point by operation of said line relay to its said particular position, a half-step relay common to said bank and operable in its opposite position to control the energizing circuits for alternate relays of said bank, and operating circuits for said half-step relay governed by said stepping relays and by said line relay for shifting said half-step relay from its then existing position to its other position upon operation of said line relay to its said another position, said half-step relay remaining at each of said positions until subsequently shifted by such operation of the line relay following energization of a stepping relay.

76. In a system of the character described, the combination with a line circuit and a line relay in said circuit intermittently operated from one particular position to another position, of a bank of stepping relays having pick-up circuits energized from a local source of current and closed at one point upon operation of said line relay to its said particular position, a half-step relay common to said bank of stepping relays and shiftable from one position to another, said half-step relay in one position cooperating with said line relay in its said particular position to cause energization of the first and succeeding odd stepping relays of the bank and in its other position the second and even stepping relays, and operating circuits for said half-step relay controlled by said stepping relays and by a said line relay for shifting said half-step relay from its then existing position to the other position each time said line relay is operated to its said another position following energization of a stepping relay by the next preceding operation of said line relay to its said particular position.

77. In a system of the character described, the combination with a line circuit intermittently energized and deenergized and a line relay in said circuit intermittently operated from one particular position to another position, a bank of stepping relays to be energized sequentially one at a time as said line relay is operated repeatedly to its said particular position, a single half-step relay common to said bank, energizing circuits for said stepping relays controlled by said half-step relay and by said line relay in its said particular position, and energizing circuits for said half-step relay being governed by said stepping relays and said line relay so as to operate said half step relay in response to operation of said line relay to its said another position following energization of a given stepping relay to cooperate with said line relay and cause energization of the next succeeding stepping relay, whereby a stepping bank for a given number of steps requires only as many stepping relays as there are steps together with the half-step relay.

78. In a remote control system, a receiver at one location comprising a line relay, a series of contacts adapted to be closed one at a time in sequence in response to the repeated operation of said line relay by a series of impulses of current, means at another distant location for imparting a particular character to selected ones of said impulses in accordance with the conditions to be transmitted from such location to the first location, a series of relays at said first location one for each of said impulses, and means at said first location rendered effective at the termination of each impulse for actuating the corresponding relay then rendered responsive by a contact of said series to a position determined by the character of said impulse.

79. In a remote control system, a line circuit having a series of time spaced impulses of distinctive character applied thereto, a relay energized for each impulse and deenergized for each time space of said series, a bank of stepping relays controlled by said relay to take one step each time such relay is energized, a series of control relays one for each step of said stepping relay bank, storing means conditioned during each impulse in accordance with the character of that impulse, and circuit means including contacts of said stepping relays rendered effective during each time space for actuating the particular control relay for that step in accordance with the character of the preceding impulse as stored in said storing means, whereby said control relays are actuated in accordance with their respective impulses while said stepping relay bank is in a static condition.

80. In a centralized traffic controlling system, the combination with a control office and a plurality of field stations, a stepping line wire and a message line wire connected to a common return line wire at the last field station so as to form a stepping line circuit and message line circuit both energized from sources of current in the control office and extending from the control office through the several field stations, transmitting means in the control office for applying to said stepping line circuit any one of a number of different series of impulses of selected polarities, step-by-step means in the control office and at each of said field stations operated synchronously by said impulses on said stepping line circuit, electro-responsive means for each step of the step-by-step means at each of said stations selectively responsive to the polarity of the impulse on said stepping line circuit for that step, pulsing means effective on each step of said step-by-step means at each station for controlling the opened or closed condition of said message line circuit, electro-responsive means for each step of said step-by-step means at said control office controlled by the energization or deenergization of the message line circuit for that step, and means controlled by said transmitting means to increase or decrease the resistance of said message line circuit in accordance with the polarity of the impulse on said stepping line circuit so as to maintain the current flow in said message line circuit substantially constant when such message line circuit is closed during transmission of an impulse on said stepping line circuit.

81. In a system of the character described for transmitting indications from a remote field station to a control office, a line circuit connecting the control office and field station operated in synchronism, means at the field station effective to distinctively condition said line circuit on each step in accordance with the indication to be transmitted on that step, a plurality of indication relays, one for each step, and each being responsive to the polarity of its energization and remaining in its operated condition after deenergization until subsequently energized with the opposite polarity, an energizing circuit for each of said indication relays including a contact closed only on its respective step of said step-by-step means at the control office and a contact which supplies said circuit with one polarity or the other from a local source dependent upon the distinctive condition of said line circuit for the corresponding step, said energizing circuits for said control relays being energized in succession by the operation of said step-by-step means, and contact means for opening all of said energizing circuits between every step of said step-by-step means.

82. In a system of the character described for transmitting indications from a field station to a control office; a stepping line circuit connecting the control office and the field station; a message line circuit connecting the control office with the field station; means in the control office for impressing a series of impulses on said stepping line circuit; a bank of stepping relays at the control office and at the field station both operated in synchronism to take one step during each impulse on said stepping line circuit; means at the field station effective to energize said message line circuit or to deenergize said message line circuit in accordance with the indication to be transmitted on that step; a line relay at the control office responsive to the energization and deenergization of said message line circuit; a plurality of indication relays, one for each step, and each responsive to the polarity of its energization and remaining in its operated condition after deenergization until subsequently energized with an opposite polarity; and an energizing circuit for each of said indication relays, including a contact of its corresponding stepping relay and with an opposite polarity; and an energizing circuit is deenergized, and supplied with current of one polarity or the other from a local source dependent upon the condition of energization of said message line circuit as repeated by said line relay, said energizing circuits for said indication relays being energized in succession by the operation of said stepping relays.

NEIL D. PRESTON.
FOREST B. HITCHCOCK.